United States Patent
Suzuki

(10) Patent No.: US 12,493,397 B2
(45) Date of Patent: Dec. 9, 2025

(54) INFORMATION PROCESSING APPARATUS AND NON-TRANSITORY COMPUTER READABLE STORAGE MEDIUM STORING INFORMATION PROCESSING PROGRAM FOR CLASSIFYING, GENERATING AND DISPLAYING OPERATORS RELATED TO SETTING VALUES

(71) Applicant: FUJIFILM CORPORATION, Tokyo (JP)

(72) Inventor: Takayuki Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 232 days.

(21) Appl. No.: 18/046,515

(22) Filed: Oct. 14, 2022

(65) Prior Publication Data
US 2023/0244358 A1    Aug. 3, 2023

(30) Foreign Application Priority Data
Feb. 2, 2022    (JP) .................................. 2022-015125

(51) Int. Cl.
G06F 3/0482    (2013.01)
G06F 3/12    (2006.01)
H04N 1/00    (2006.01)

(52) U.S. Cl.
CPC .......... *G06F 3/0482* (2013.01); *G06F 3/1257* (2013.01); *G06F 3/1273* (2013.01); *H04N 1/00517* (2013.01)

(58) Field of Classification Search
CPC . H04N 1/00517; G06F 3/1257; G06F 3/1273; G06F 3/0482
See application file for complete search history.

(56) References Cited

U.S. PATENT DOCUMENTS 11,611,675 B2 *    3/2023    Noda ................. H04N 1/00482
2005/0166157 A1    7/2005    Ollis et al.
(Continued)

FOREIGN PATENT DOCUMENTS

JP    2005-222541 A    8/2005
JP    2011-066665 A    3/2011
(Continued)

OTHER PUBLICATIONS

English language translation of the following: Office action dated Aug. 19, 2025 from the JPO in a Japanese patent application No. 2022-015125 corresponding to the instant patent application. This office action translation is submitted now in order to supplement the understanding of the cited references which are being disclosed in the instant Information Disclosure Statement.
(Continued)

*Primary Examiner* — Nicholas Ulrich
(74) *Attorney, Agent, or Firm* — SOLARIS Intellectual Property Group, PLLC

(57) ABSTRACT

An information processing apparatus includes a processor configured to classify plural first operators into groups in accordance with a predetermined rule. The first operators are operators associated with setting values of items for defining execution conditions of functions, and are subjected to remaining setting for causing a first operator to preferentially remain in a list over other operators among operators in the list, which execute a function in accordance with the execution condition in a case of being selected by a user. The first processor is also configured to generate a second operator that is a new operator obtained by integrating the first operators classified into the identical group, and to display the second operator in the list instead of each of the first operators classified into the identical group.

18 Claims, 14 Drawing Sheets

(56) References Cited

U.S. PATENT DOCUMENTS

| | | |
|---|---|---|
| 2016/0065766 A1 | 3/2016 | Miyamoto |
| 2018/0139343 A1* | 5/2018 | Igawa .................. G06F 3/1204 |
| 2018/0217797 A1* | 8/2018 | Inoue ................ H04N 1/00408 |
| 2018/0220015 A1 | 8/2018 | Akuzawa |
| 2019/0212899 A1* | 7/2019 | Kamasuka .......... G06F 3/04817 |
| 2019/0306349 A1 | 10/2019 | Shino et al. |
| 2021/0185187 A1 | 6/2021 | Shino et al. |

FOREIGN PATENT DOCUMENTS

| | | |
|---|---|---|
| JP | 2016-045872 A | 4/2016 |
| JP | 2017-158001 A | 9/2017 |
| JP | 2018-081345 A | 5/2018 |
| JP | 2018-125686 A | 8/2018 |
| JP | 2018-125687 A | 8/2018 |
| JP | 2020-123235 A | 8/2020 |
| JP | 2021-175021 A | 11/2021 |

OTHER PUBLICATIONS

English language translation of the following: Office action dated Oct. 21, 2025 from the JPO in a Japanese patent application No. 2022-015125 corresponding to the instant patent application. This office action translation is submitted now in order to supplement the understanding of the cited references which are being disclosed in the instant Information Disclosure Statement.

* cited by examiner

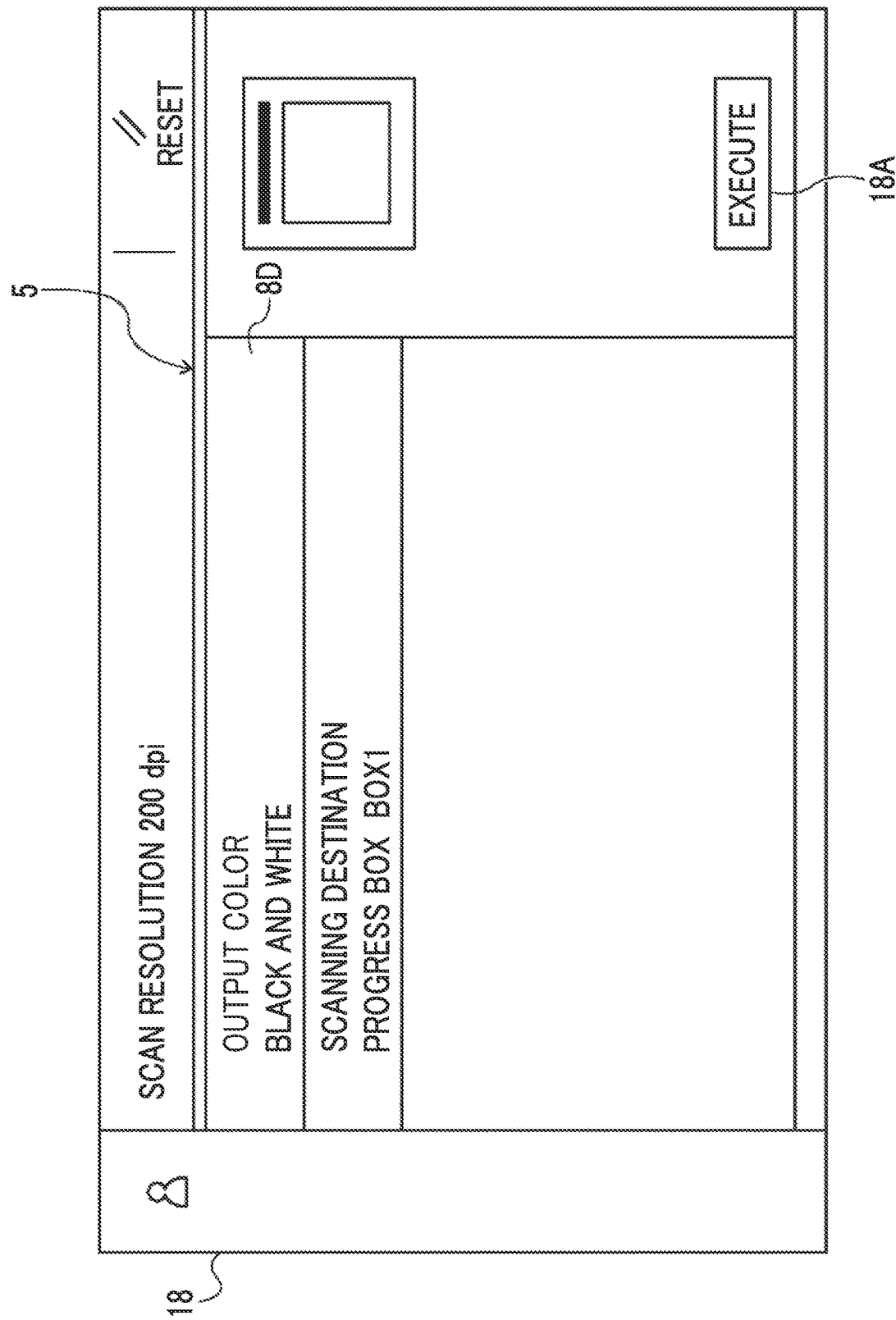

FIG. 15

| SCORE | COMMON SETTING VALUE |
|---|---|
| 98 | PROGRESS BOX SCAN RESOLUTION 200 dpi |
| 93 | PROGRESS BOX SCAN BOX1 RESOLUTION 200 dpi |
| 86 | PROGRESS BOX SCAN BOX1 COLOR RESOLUTION 200 dpi |
| : | : |

| EVALUATION CRITERIA | SCORE |
|---|---|
| DISPLAY BY HIERARCHY | 82 |
| DISPLAY BY SIMPLIFIED SETTING SCREEN | 89 |
| : | : |

36

INFORMATION PROCESSING APPARATUS AND NON-TRANSITORY COMPUTER READABLE STORAGE MEDIUM STORING INFORMATION PROCESSING PROGRAM FOR CLASSIFYING, GENERATING AND DISPLAYING OPERATORS RELATED TO SETTING VALUES

CROSS-REFERENCE TO RELATED APPLICATIONS

This application is based on and claims priority under 35 USC 119 from Japanese Patent Application No. 2022-015125, filed on Feb. 2, 2022, the disclosure of which is incorporated by reference herein, in its entirety.

BACKGROUND

(i) Technical Field

The present invention relates to an information processing apparatus and a non-transitory computer readable storage medium storing an information processing program.

(ii) Related Art

JP2020-123235A discloses an image processing apparatus including a display unit that displays a setting screen on which either a combination of a plurality of first initial values that are initial values at the time of shipment from a factory or a combination of a plurality of second initial values that are set as defaults by a user is set. On the setting screen, setting values are changeable before a processing unit is executed by using one of a plurality of functions of the image processing apparatus. The image processing apparatus includes a management unit that executes one of the functions in advance and manages setting contents of the executed job. The display unit displays a setting history button for executing the processing unit again based on information managed by the management unit. A difference between the first initial value and the setting value and a difference between the second initial value and the setting value are displayed on the setting history button.

SUMMARY

There is an apparatus that, in a case where the function is executed, displays an operator associated with setting information storing the setting value representing an execution condition of the function, which has been previously set by the user is displayed in a list, and causes the user to select the displayed operator, and thus executes the function with the setting value identical to the setting value included in the setting information associated with the selected operator without the user setting the setting value again.

In such an apparatus, a new operator is added to the list each time the user sets the execution condition of the function. Thus, an operation referred to as "pinning" of setting a specific operator to be preferentially displayed over other operators in the list even though the new operator is added may be prepared.

However, although the pinned operator is preferentially displayed over other operators in the list, as the number of pinned operators increases, the user has difficulty in finding a target operator from a plurality of pinned operators.

Aspects of non-limiting embodiments of the present disclosure relate to an information processing apparatus and a non-transitory computer readable storage medium storing an information processing program capable of making a user to easily finding a target operator from a list in comparison to a case where each operator on which remaining setting for causing the operator to preferentially remain in the list over other operators is performed is displayed in the list as it is.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to: classify a plurality of first operators into groups in accordance with a predetermined rule, the first operators being operators associated with setting values of items for defining execution conditions of functions, and being subjected to remaining setting for causing a first operator to preferentially remain in a list over other operators among operators in the list, which execute a function in accordance with the execution condition in a case of being selected by a user; generate a second operator that is a new operator obtained by integrating the first operators classified into the identical group; and display the second operator in the list instead of each of the first operators classified into the identical group.

BRIEF DESCRIPTION OF THE DRAWINGS

Exemplary embodiment(s) of the present invention will be described in detail based on the following figures, wherein:

FIG. 13 is a diagram illustrating an example of the simplified setting screen;

FIG. 15 is a diagram illustrating a display example of a score; and

FIG. 16 is a diagram illustrating another display example of the score.

DETAILED DESCRIPTION

Figure 1:
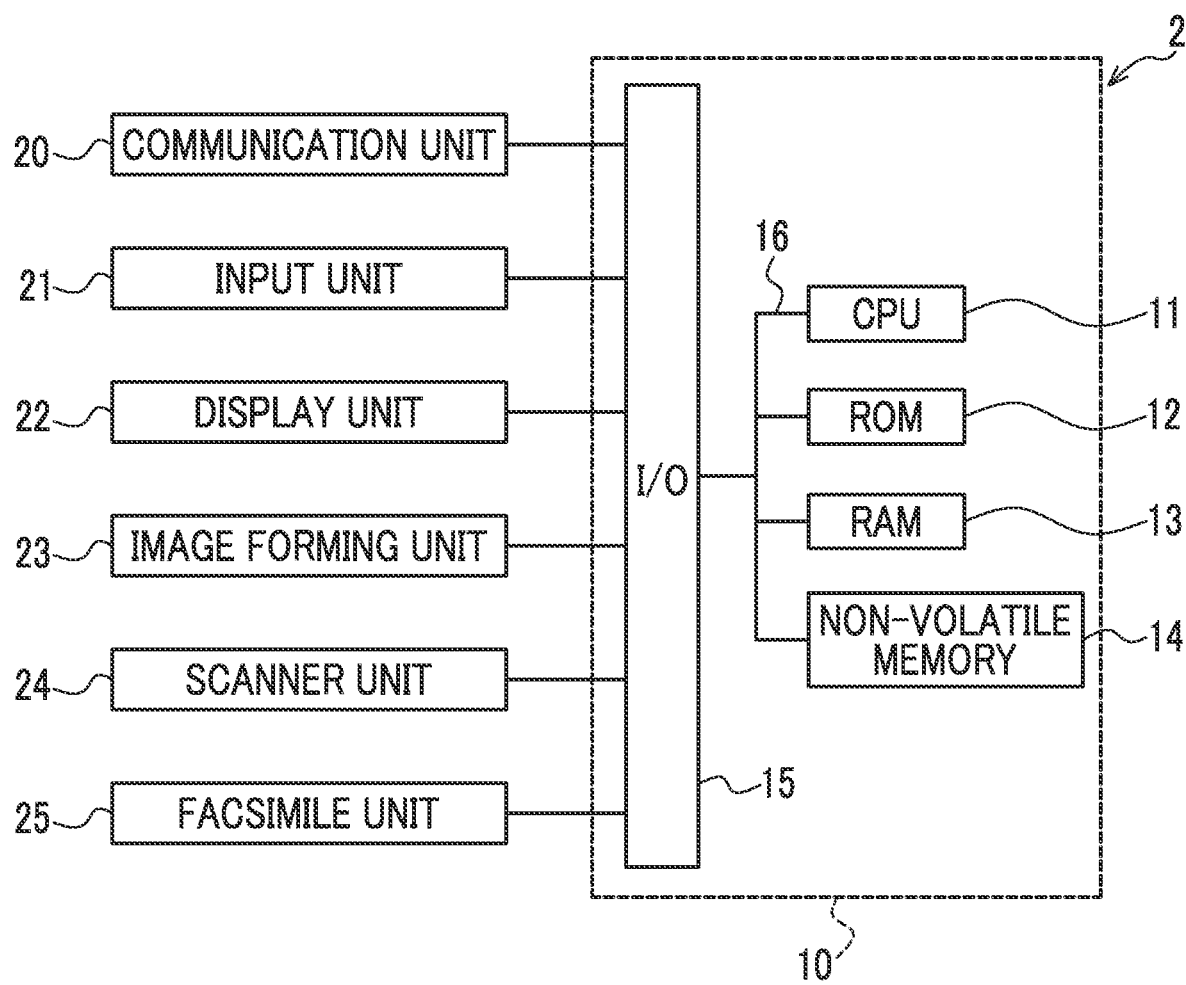
FIG. 1 is a diagram illustrating a configuration example of main units of an information processing apparatus.

Hereinafter, the present exemplary embodiment will be described in detail with reference to the accompanying drawings. The identical components and the identical processes are denoted by the identical reference signs in the drawings, and repetitive description will be omitted.

FIG. 1 is a diagram illustrating a configuration example of main units of an information processing apparatus. An information processing apparatus according to the present exemplary embodiment is an apparatus that executes a function selected in accordance with setting information set by a user for each setting item. Any type of information processing apparatus may be used without restriction as long as the information processing apparatus receives an operation from a user and displays an operator for starting execution of a function on a screen.

Here, the "setting item" is an item for defining an execution condition of the function, and is an example of an "item" according to the present exemplary embodiment. "Setting information" is information in which a setting value set for each setting item and a function name to which the setting item is set are stored in association with each other. There are no restrictions on the content of the setting value, and for example, numerical values, texts, symbols, graphics, and images can be used. The "operator" is a user interface that is an object to be operated by the user and via which the information processing apparatus receives an operation from the user.

An exemplary embodiment of the information processing apparatus will be described below by using an image forming apparatus 2 as an example of the information processing apparatus. The image forming apparatus 2 includes at least one of a plurality of functions, for example, an image forming function of forming the contents of a designated file on a recording medium, a scanner function of optically scanning the contents described in a document, a copying function of forming the scanned contents of the document on a recording medium as an image, a facsimile function of transmitting and receiving image data via a public line and forming the received image data on a recording medium as an image, an e-mail function of transmitting received data by electronic mail, and an FTP function of transmitting received data by the file transfer protocol (FTP). The information processing apparatus may be information equipment such as a smart phone, a tablet terminal, a wearable device, and a desktop computer.

The image forming apparatus 2 is configured by using a computer 10, for example. The computer 10 includes a central processing unit (CPU) 11 that is an example of a processor that executes functions, a read only memory (ROM) 12 that stores an information processing program for causing the computer 10 to function as the image forming apparatus 2, a random access memory (RAM) 13 used as a temporary work region of the CPU 11, a non-volatile memory 14, and an input and output interface (I/O) 15. The CPU 11, the ROM 12, the RAM 13, the non-volatile memory 14, and the I/O 15 are connected to each other via a bus 16.

The non-volatile memory 14 is an example of a storage device that retains stored information even though power supplied to the non-volatile memory 14 is cut off. As the non-volatile memory 14, for example, a semiconductor memory is used, and a hard disk may be used. Information required to be continuously stored even though the power of the image forming apparatus 2 is cut off, such as setting information, is stored in the non-volatile memory 14.

The non-volatile memory 14 is not necessarily required to be mounted in the computer 10, and may be a portable storage device capable of being attached and detached to and from the computer 10, for example.

For example, a communication unit 20, an input unit 21, a display unit 22, an image forming unit 23, a scanner unit 24, and a facsimile unit 25 are connected to the I/O 15.

The communication unit 20 is connected to a communication line and has a communication protocol for transmitting and receiving data to and from an external device connected to the communication line. The e-mail function and the FTP function of the image forming apparatus 2 transmit and receive data through the communication unit 20.

The input unit 21 is a device that receives a user instruction and notifies the CPU 11 of the user instruction, and includes, for example, buttons, a touch panel, a mouse, a keyboard, and a pointing device. The image forming apparatus 2 in the present exemplary embodiment includes at least a touch panel as the input unit.

The display unit 22 is an example of a display device that displays information processed by the CPU 11 as an image, and includes, for example, a liquid crystal display or an organic electro-luminescence (EL) display. As an example, a touch panel which is an example of the input unit 21 is attached to the display unit 22 to overlap the display unit 22. In a case where the user presses an operator displayed at a location at which the touch panel has been pressed, the CPU 11 is notified of an instruction associated with the pressed operator. Operating the operator by pressing the operator through the touch panel is referred to as "selecting" the operator.

The image forming unit 23 is a unit that forms a received image on a recording medium in accordance with an instruction from the CPU 11. Any method may be used as an image forming method in the image forming unit 23. For example, any of an electrophotographic method, an inkjet method, or an offset printing method may be used. The image forming unit 23 is used along with the execution of the image forming function, the copying function, and the facsimile function.

The scanner unit 24 is a unit that optically scans the contents of a document placed on, for example, a platen glass and converts the scanned contents of the document into image data, in accordance with instructions from the CPU 11. The scanner unit 24 is used along with the execution of the scanner function, the copying function, and the facsimile function.

The facsimile unit 25 is a unit that transmits image data obtained by, for example, the scanner unit 24 to another facsimile device via a public line and receives image data from another facsimile device via the public line. The CPU 11 causes the image forming unit 23 to form an image on a recording medium from the image data received from the public line. By convention, the facsimile may be referred to as "fax".

The copying function is realized in a manner that the CPU 11 causes the image forming unit 23 to form image data obtained by the scanner unit 24 on a recording medium.

Figure 2:
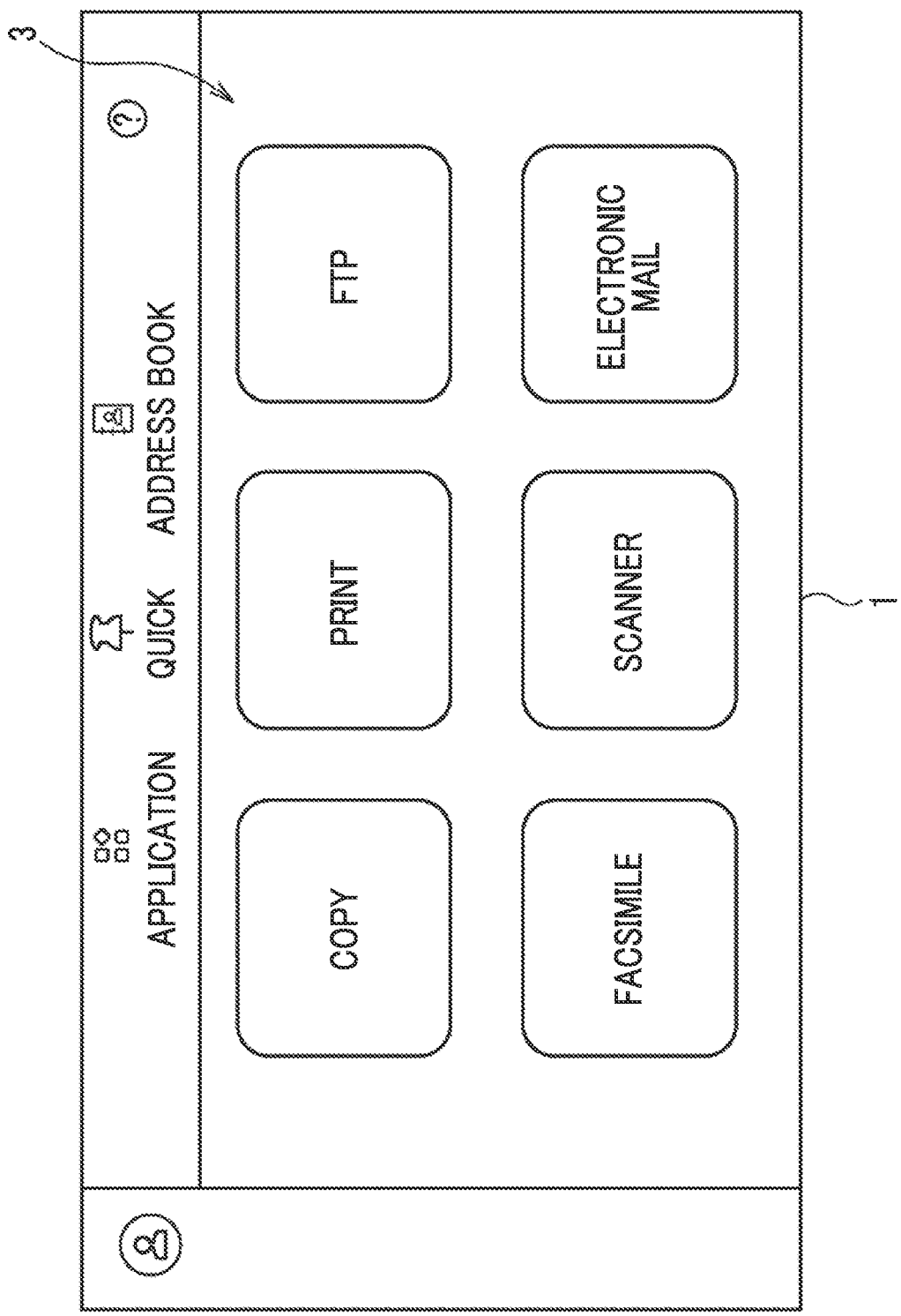
FIG. 2 is a diagram illustrating an example of a menu screen.

FIG. 2 is a diagram illustrating an example of a menu screen 1 displayed on the display unit 22 of the image forming apparatus 2. The menu screen 1 is an example of an initial screen that is first displayed on the display unit 22 in a case where the power of the image forming apparatus 2 is turned ON.

Menu buttons 3 for causing the user to select a function to be executed are displayed on the menu screen 1. The menu buttons 3 include a copy button for executing the copying function, a print button for executing the image forming function, a facsimile button for executing the facsimile function, a scanner button for executing the scanner function, an FTP button for executing the FTP function, and an e-mail button for executing the e-mail function.

In a case where the user selects the menu button 3 corresponding to a certain function, a setting screen 4 of the function associated with the selected menu button 3 is displayed on the display unit 22. The setting screen 4 includes setting items for defining execution conditions of the functions.

Figure 3:
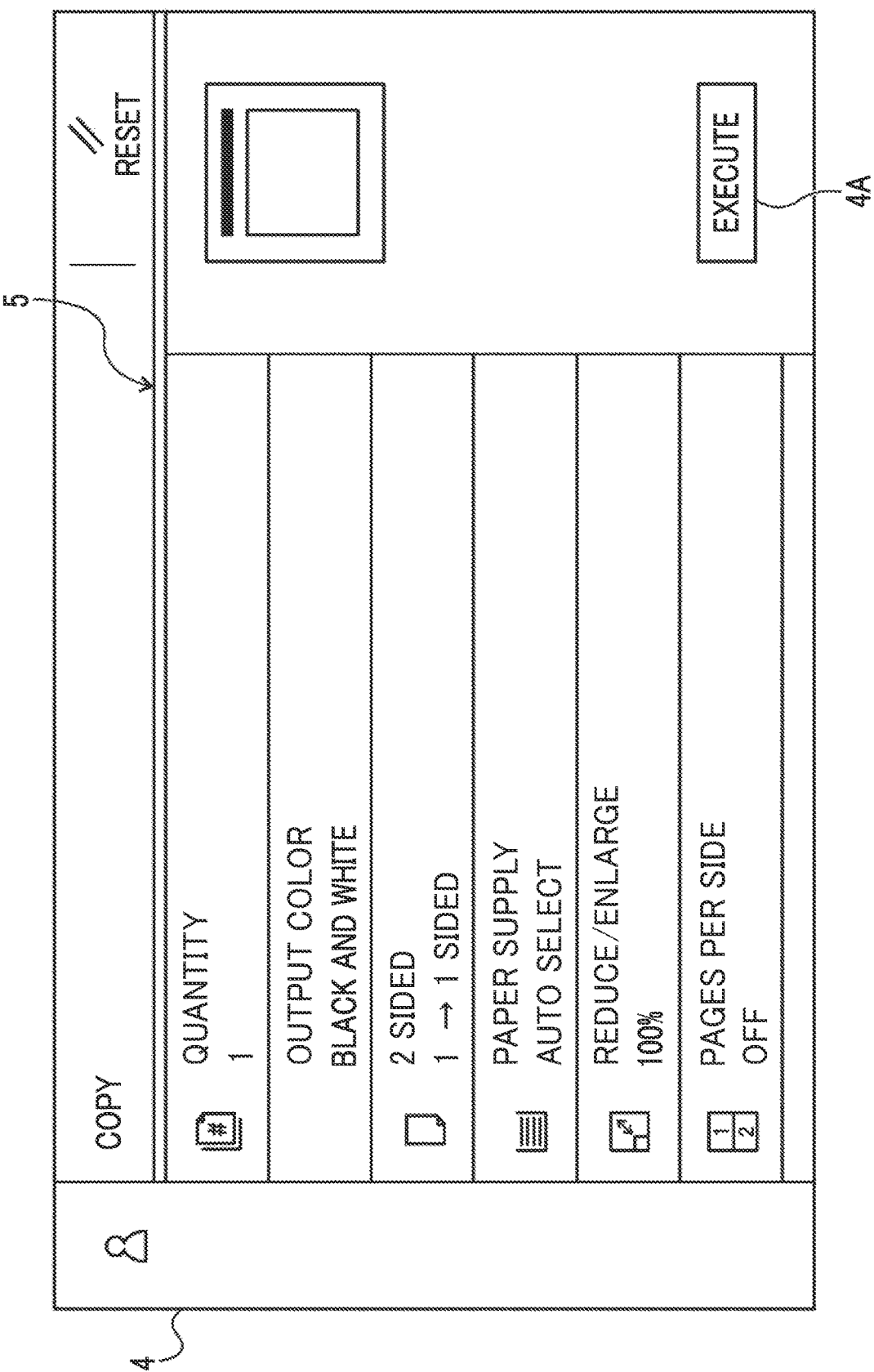
FIG. 3 is a diagram illustrating an example of a setting screen.

FIG. 3 is a diagram illustrating an example of the setting screen 4 displayed in a case where the user selects the copy button from the menu buttons 3, for example.

The setting screen 4 is a screen for displaying the current setting values that are set for each setting item prepared in advance for each function. In a case where it is not possible to display all the setting items within a display range of the setting screen 4, the user horizontally scrolls the setting screen 4 to display all the setting items.

Setting items related to the copying function include, for example, items such as the quantity of copies, an output color of designating the color of the copied image, a copy surface (1sided or 2sided) of designating a recording medium surface on which copying is performed, paper supply of selecting paper on which copying is performed, the reduce/enlarge for setting the enlargement and reduction ratio of the copy, and pages per side for designating the number of pages to be copied together on one page.

An initial value predetermined by the image forming apparatus 2 is set as a setting value for each setting item. The user changes the setting value in the setting item required to be changed in order to execute copying in accordance with the intention of the user, from the initial value to the intended value through the setting screen 4. As the initial value, the setting value set in advance by the manufacturer of the image forming apparatus 2 at the time of shipment from the factory is used, but the user may operate the input unit 21 to change the initial value. The image forming apparatus 2 may use the setting value for each setting item set immediately before, as the initial value of the setting item.

In a case where the user selects an execute button 4A to execute the copying function, the image forming apparatus 2 executes copying in accordance with the setting value set for each setting item of the copying function. The image forming apparatus 2 generates setting information each time the image forming apparatus 2 executes the function. The image forming apparatus 2 associates, for example, a management ID for managing the setting information, the date and time at which the function has been executed, and a user ID for identifying the user who has executed the function with the generated setting information and stores the result of the association in the non-volatile memory 14.

Here, the generation of the setting screen 4 and the setting information in a case where the copying function is selected has been described as an example. Even in a case where the user selects another function other than the copying function, the image forming apparatus 2 displays the setting screen 4 corresponding to the selected function on the display unit 22, and receives the setting of the setting value for each setting item. Even in a case where the user selects another function other than the copying function, the image forming apparatus 2 generates the setting information each time the function is executed.

The user may set the setting value for each setting item from the setting screen 4 each time the function is executed. Shortcut buttons are provided so that the function can be executed even though the user does not perform the identical setting in a case where the function is executed with settings having the identical setting values to the setting values previously set.

Next, the shortcut button associated with each piece of setting information will be described.

Figure 4:
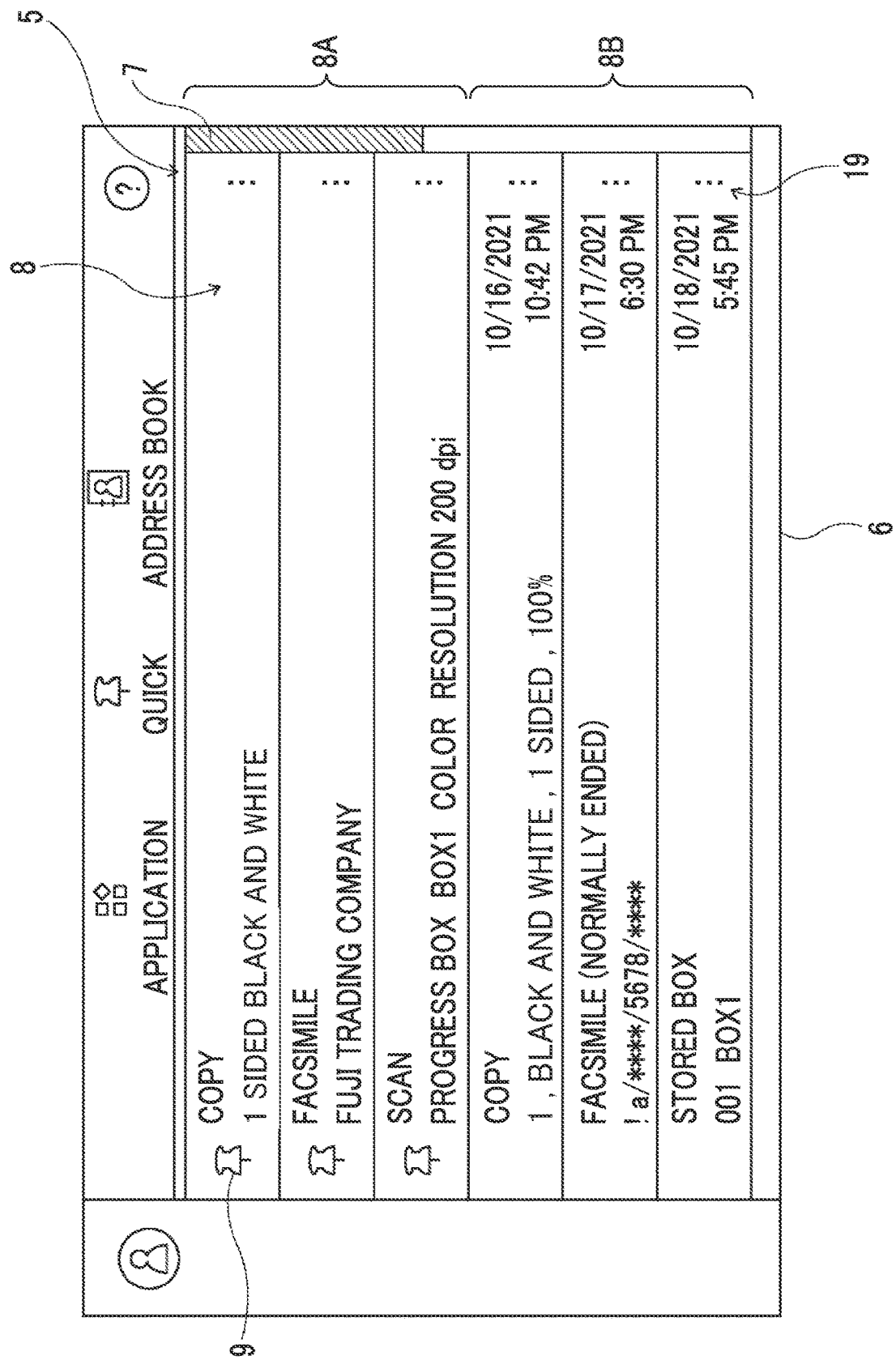
FIG. 4 is a diagram illustrating an example of a history screen.

FIG. 4 is a diagram illustrating an example of a history screen 6 for displaying the setting information stored in the non-volatile memory 14. The history screen 6 is displayed, for example, in a case where the user presses the "quick" button displayed on the upper side of the menu screen 1 illustrated in FIG. 2. In the example of the history screen 6 illustrated in FIG. 4, a plurality of executed functions are displayed to be arranged in chronological order from the top to the bottom. Thus, pieces of the setting information of different functions are mixed and displayed in the list 5. It is also possible to arrange and display only pieces of the setting information of the types of functions designated by the user in chronological order in the list 5. In a case where the "application" button displayed on the upper side of FIG. 4 is pressed, the menu screen 1 illustrated in FIG. 2 is displayed.

The list 5 on the history screen 6 displays list items 8 associated with respective pieces of the setting information stored in the non-volatile memory 14. In a case where the user selects any of the list items 8, the function stored in the setting information is executed with the identical setting value to the setting value stored in the setting information in accordance with the setting information associated with the selected list item 8. The function name of the setting information associated with the list item 8 and the setting value of each setting item are displayed in the list item 8.

The user selects an intended list item 8 from the list 5 on the history screen 6 by referring to the function name and the setting value of each setting item displayed in the list item 8. Thus, it is possible to execute the identical function in accordance with the identical setting information to the setting information previously set by the user without setting the setting value of each setting item from the setting screen 4 in FIG. 3 each time the function is executed.

For example, in a case where the user selects the list item 8 displayed as "copy and one-sided black-and-white" in FIG. 4, the image forming apparatus 2 executes the copying function in which one side of a recording medium is used as the copy surface, and the output color is set to the black-and-white.

In a case where it is not possible to display all the list items 8 within the display range of the list 5, all the list items 8 are displayed by scrolling the list 5 with a scroll bar 7.

On the other hand, an upper limit may be provided in the number of list items 8 displayed in the list 5 by specifications. In a case where the number of pieces of the setting information stored in the non-volatile memory 14 increases due to the execution of the function in the image forming apparatus 2 and the number of list items 8 associated with the setting information reaches the upper limit, the list item 8 associated with the older setting information is deleted from the list 5 in order.

Therefore, in the image forming apparatus 2, remaining setting may be performed. The remaining setting is provided for causing the list item 8 designated by the user to preferentially remain in the list 5 over other list items 8 that are not designated by the user so that the list item 8 designated by the user is not removed from the list 5 even in a case where the number of list items 8 displayed in the list 5 increases. As described above, an operation of causing the list item 8 to remain in the list 5 is referred to as "pinning".

That is, the list items 8 displayed in the list 5 include the pinned list item 8A and the unpinned list item 8B. As illustrated in FIG. 4, the pinned list item 8A in the list 5 is displayed ahead of the unpinned list items 8B, that is, at the top of the list 5.

In a case where there is no need to distinguish between the pinned list item 8A and the unpinned list item 8B, both the pinned list item 8A and the unpinned list item 8B are referred to as the "list item 8" below. The pinned list item 8A is referred to as the "list item 8A", and the unpinned list item 8B is referred to as the "list item 8B". The list item 8A and the list item 8B are examples of the "operator" according to the present exemplary embodiment, and the list item 8A is an example of a "first operator" according to the present exemplary embodiment.

For convenience of description, the setting value of the setting information associated with the list item 8 will be referred to as "the setting value of the list item 8".

Pinning of the list item 8 is performed from a setting menu (not illustrated) displayed, for example, in a case where a menu icon 19 provided for each list item 8 is selected. In a case where the list item 8B is pinned, a residual icon 9 having a pin shape is displayed on the list item 8B, for example, like the list item 8A in FIG. 4.

The image forming apparatus 2 also receives a pinning operation by the user from a screen other than the history screen 6. For example, the user can pin setting information set from the setting screen 4 illustrated in FIG. 3. That is, it is possible to pin not only setting information of the executed function, but also setting information of the function that is about to be executed. In a case where the user performs pinning on the setting screen 4, the list item 8A corresponding to a combination of the function selected on the menu screen 1 illustrated in FIG. 2 and the pinned setting information is displayed in the list 5.

As the number of list items 8A displayed in the list 5 increases, the user has more difficulty in finding the list item 8A set as the target. Therefore, the image forming apparatus 2 reduces the number of list items 8A displayed in the list 5 by classifying a plurality of list items 8A into groups in accordance with a predetermined rule, and generating a new list item 8 obtained by integrating the list items 8A classified into the identical group.

A display processing of the list 5 along with the integration of list items 8A will be described below.

Figure 5:
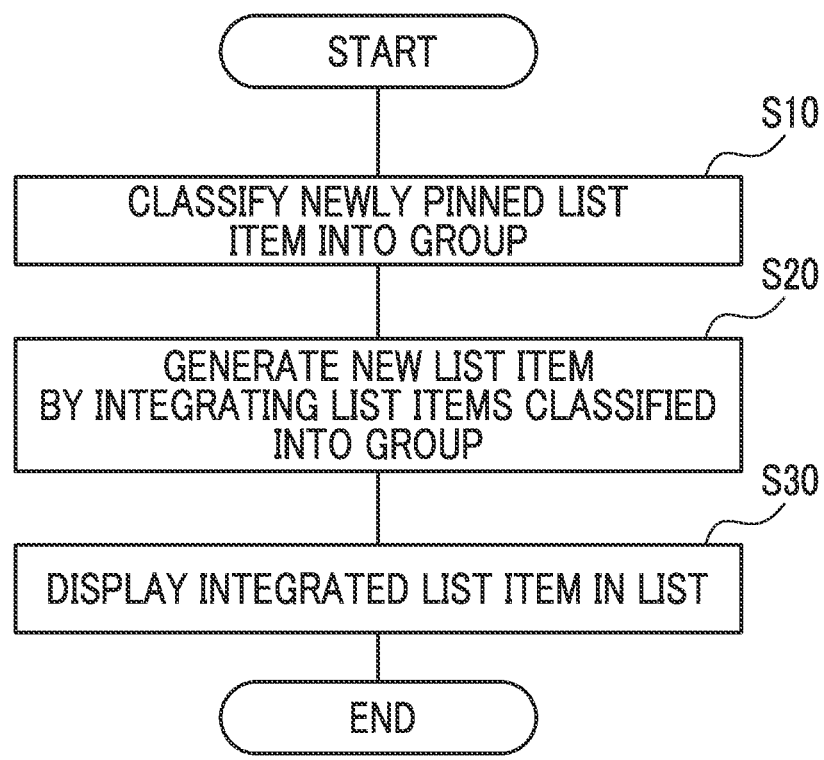
FIG. 5 is a flowchart illustrating an example of a flow of a list display process.

FIG. 5 is a flowchart illustrating an example of a flow in the display process of the list 5 executed by the CPU 11 of the image forming apparatus 2 in a case where a new list item 8A set by the user is displayed in the list 5, for example.

An information processing program for defining the display process of the list 5 is stored in advance in the ROM 12 of the image forming apparatus 2, for example. The CPU 11 of the image forming apparatus 2 reads the information processing program stored in the ROM 12 and executes the display process of the list 5.

The setting information may be stored in an external device such as a cloud server, but here, an example in which the setting information is stored in the non-volatile memory 14 of the image forming apparatus 2 will be described.

In Step S10, the CPU 11 classifies the newly set list items 8A into groups consisting of a plurality of list items 8A, in accordance with a predetermined classification rule.

The classification rule for classifying the list items 8A may be any rule that can classify the list items 8A into groups. For example, a classification rule of classifying the list items 8A into a group in which the difference between the setting values of the setting items of the list items 8A is minimized. The classification rule used to classify the list items 8A is an example of a "predetermined rule" according to the present exemplary embodiment.

The CPU 11 compares the setting value of the newly set list item 8A with the setting values of all the existing list items 8A displayed in the list 5 for each setting item, and classifies the existing list item 8A having the number of times that the setting value of the existing list item 8A is equal to the setting value of the newly set list item 8A, into the group which is identical to the newly set list item 8A.

At this time, the CPU 11 stores, in the RAM 13, the setting value of the setting item common to the list items 8A classified into the identical group, as a "common setting value", and stores the setting values of the different setting items of the list items 8A classified into the identical group, in the RAM 13 as "individual setting values".

In Step S20, the CPU 11 generates a new pinned list item 8C obtained by integrating the list items 8A classified into the identical group in Step S10, and associates setting information associated with each list item 8A before the integration with the list item 8C. Integration of a plurality of list items 8A means combination of the plurality of list items 8A into one list item 8C newly generated. The newly generated list item 8C is also an example of the list item 8A because the list item 8C is a pinned list item 8. In order to make the description with distinguishing between the plurality of list items 8A to be integrated and the plurality of list items 8A generated by integrating the list items 8A, the list item 8A generated by integrating a plurality of list items 8A among the list items 8A is described as the "list item 8C". The list item 8C is an example of a "second operator" according to the present exemplary embodiment.

In Step S30, the CPU 11 displays the list item 8C generated in Step S20 in the list 5 instead of each list item 8A classified into the identical group. In this case, the CPU 11 displays the common setting value of each list item 8A classified into the identical group on the newly generated list item 8C. With above description, the display process of the list 5 illustrated in FIG. 5 is ended.

Figure 6:
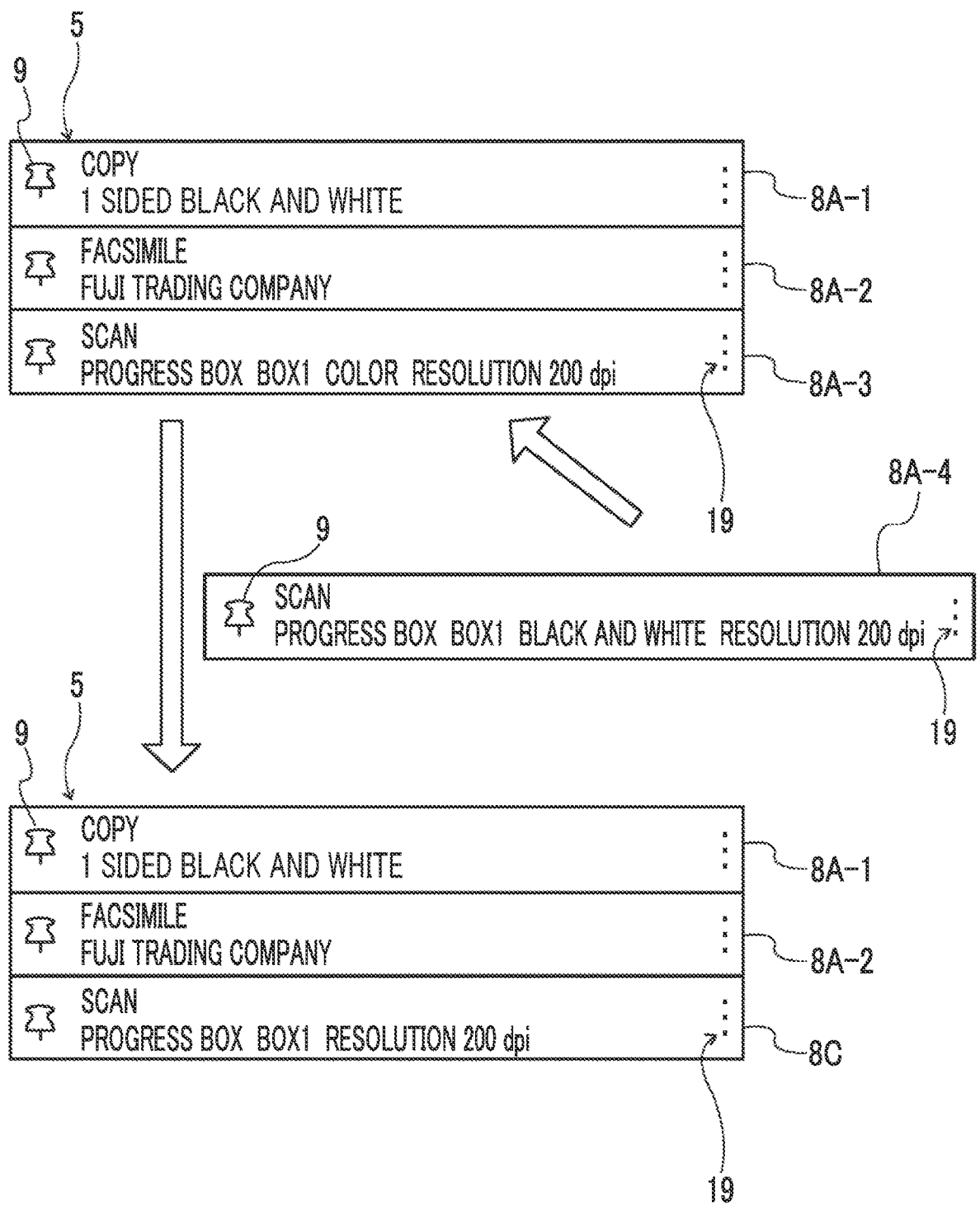
FIG. 6 is a diagram illustrating an integration example of integrating a newly set list item with an existing list item.

FIG. 6 is a diagram illustrating an integration example of integrating the newly set list item 8A with the existing list item 8A in accordance with the display process of the list 5 illustrated in FIG. 5.

In FIG. 6, list items 8A-1 to 8A-3 are the existing list items 8A, and a list item 8A-4 is the newly set list item 8A.

In this case, the list item 8A-3 and the list item 8A-4 have the largest number of common setting values, so the CPU 11 classifies the list item 8A-3 and the list item 8A-4 into the identical group and generates a list item 8C. Then, the CPU 11 displays the list item 8C in the list 5 instead of the list items 8A-3 and 8A-4.

In the example of FIG. 6, Progress box, BOX1, and Resolution of 200 dpi are the common setting values for the list items 8A-3 and 8A-4. Thus, the common setting values of "Progress box, BOX1, and Resolution of 200 dpi" are displayed on the list item 8C.

By integrating the list items 8A-3 and 8A-4 into the list item 8C, the number of pinned list items 8 displayed in the list 5 is reduced from four to three.

Figure 7:
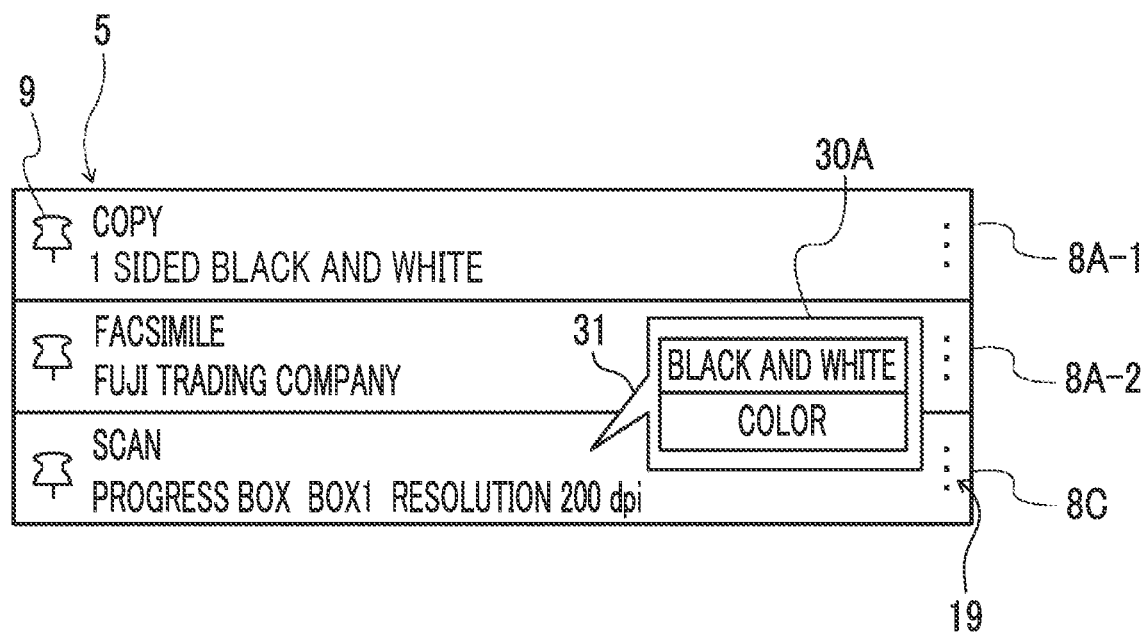
FIG. 7 is a diagram illustrating a display example in a case where the list item is selected.

In a case where the list item 8C illustrated in FIG. 6 is selected, the CPU 11 displays a menu displaying individual setting values on the history screen 6 in association with the list item 8C. In the case of the example illustrated in FIG. 6, the individual setting values of the list items 8A-3 and 8A-4 are the setting values related to the output color of the scanner function, such as black-and-white or color. Thus, in a case where the list item 8C illustrated in FIG. 6 is selected, a menu 30A is displayed, as illustrated in FIG. 7, with menu items for causing the user to select whether the output color is set to Black-and-White or Color. The association between the menu 30A and the list item 8C is represented, for example, by the position of a blowout port 31 of the menu 30A. The menu 30A in which the blowout port 31 is associated with the list item 8C is an example of a "first menu" according to the present exemplary embodiment.

In a case where the user selects the individual setting value from the menu 30A, the designated function is executed in accordance with each setting value obtained by combining the common setting value displayed in the list item 8C associated with the menu 30A and the individual setting value selected from the menu 30A.

For example, in a case where Black-and-White is selected from the menu 30A in FIG. 7, the scanner function is executed in accordance with each setting value of Progress box, BOX1, Resolution of 200 dpi, and Black-and-White. Further, for example, in a case where the color is selected from the menu 30A in FIG. 7, the scanner function is executed in accordance with each setting value of Progress box, BOX1, Resolution of 200 dpi, and Color. That is, in a case where Black-and-White is selected from the menu 30A in FIG. 7, the scanner function is executed under the identical execution conditions to the execution conditions in a case where the list item 8A-4 in FIG. 6 is selected. In a case where Color is selected from the menu 30A in FIG. 7, the scanner function is executed under the identical execution conditions to the execution conditions in a case where the list item 8A-3 in FIG. 6 is selected.

So far, an example of integrating two list items 8A has been described with reference to FIG. 6. Even in a case where three or more list items 8A are classified into the identical group by using another classification rule, the CPU 11 integrates the list items 8A into the list item 8C and displays the list item 8C in the list 5 in the identical manner to the manner of integrating the two list items 8A.

Figure 8:
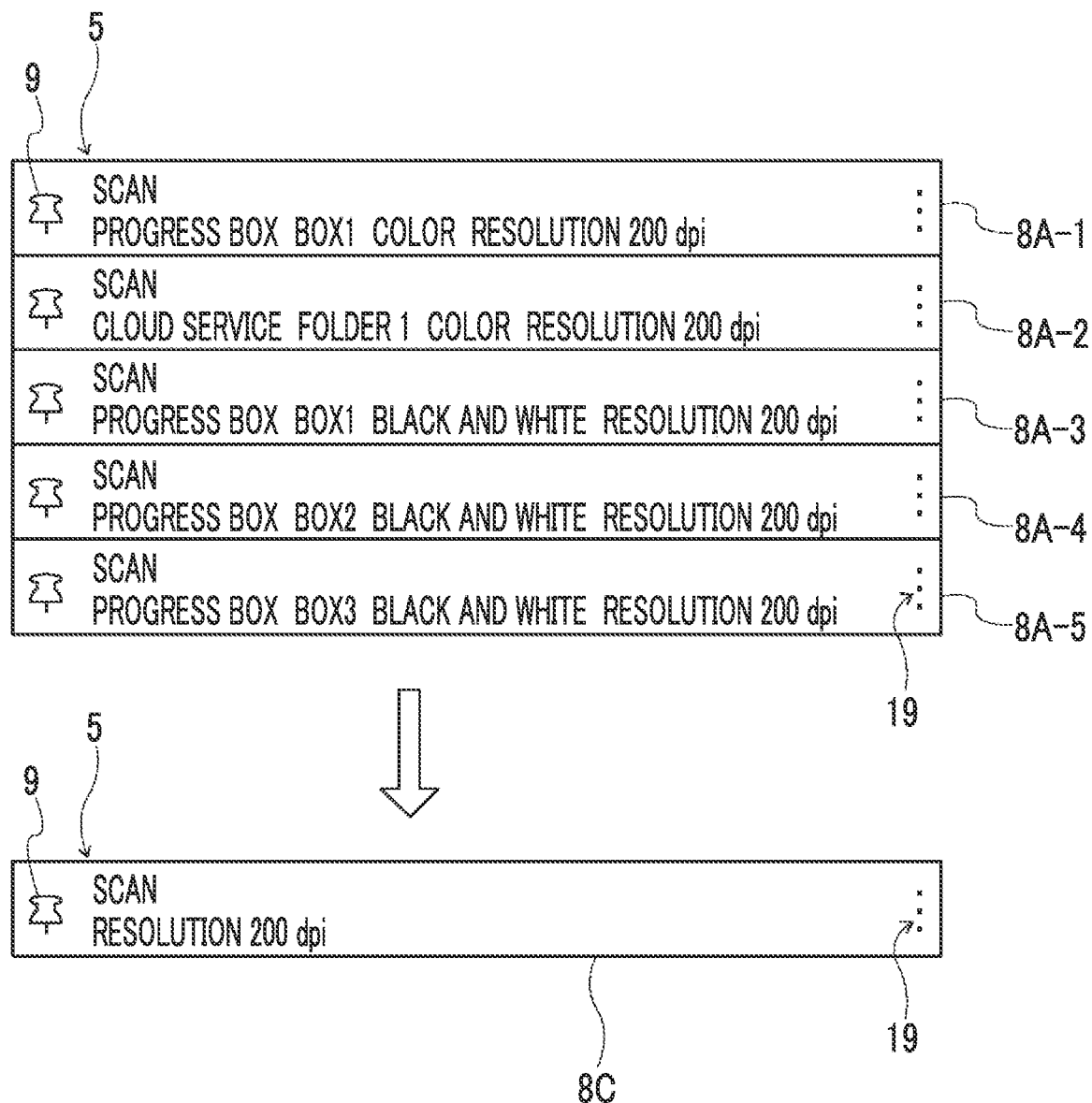
FIG. 8 is a diagram illustrating an integration example of three or more list items.

FIG. 8 is a diagram illustrating an integration example of integrating five list items 8A-1 to 8A-5 related to the scanner function, which are classified into the identical group.

In FIG. 8, the common setting value for the list items 8A-1 to 8A-5 is Resolution of 200 dpi. In this case, the CPU 11 displays the list item 8C of the scanner function displayed with "Resolution of 200 dpi" in the list 5 instead of the list items 8A-1 to 8A-5.

In a case where the list item 8C illustrated in FIG. 8 is selected, the CPU 11 displays a menu 30A displaying individual setting values on the history screen 6 in association with the list item 8C.

In the case of the example illustrated in FIG. 8, the individual setting values of the list item 8A-1 are Progress box, BOX1, and Color, and the individual setting values of the list item 8A-2 are Cloud service, Folder 1, and Color. In addition, the individual setting values in the list item 8A-3 are Progress box, BOX1, and Black-and-White, the individual setting values in the list item 8A-4 are Progress box, BOX2, and Black-and-White, and the individual setting values in the list item 8A-5 are Progress box, BOX3, and Black-and-White.

Thus, in a case where the list item 8C illustrated in FIG. 8 is selected, the CPU 11 may display, on the list 5, the menu 30A in which each individual setting value of the list items 8A-1 to 8A-5 illustrated in FIG. 8 are set as menu items. However, there are further the common setting values of Progress box and BOX1 between the individual setting values of the list item 8A-1 illustrated in FIG. 8 and the individual setting values of the list item 8A-3 illustrated in FIG. 8. In such a case, the CPU 11 classifies the list item 8A-1 and the list item 8A-3 into the identical group. Then, the CPU 11 displays the common setting values among the individual setting values of the list item 8A-1 and the list item 8A-3, that is, Progress box and BOX1 on the menu 30A. Then, the CPU 11 displays the remaining setting values, that is, "Color" of the list item 8A-1 in FIG. 8 and "Black-and-White" of the list item 8A-3 in FIG. 8 on a common submenu 30B for displaying each individual setting value.

Figure 9:
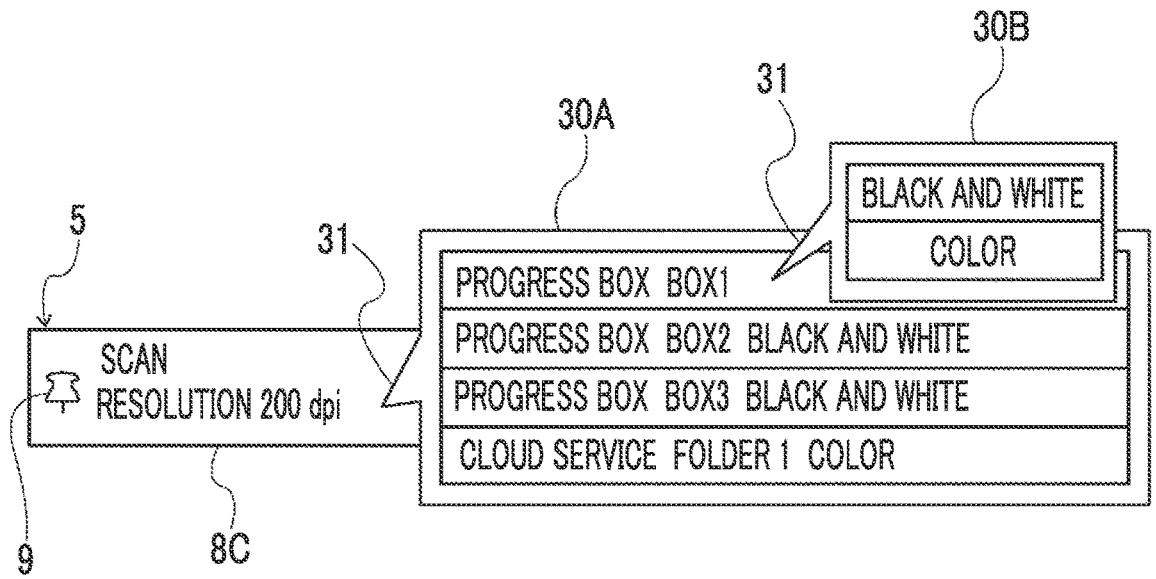
FIG. 9 is a diagram illustrating another display example in a case where the list item is selected.

FIG. 9 is a diagram illustrating a display example in a case where the list item 8C illustrated in FIG. 8 is selected. The association between the menu items in the menu 30A and the submenu 30B is represented, for example, by the position of the blowout port 31 of the submenu 30B. The submenu 30B in which the blowout port 31 is associated with the menu item of the menu 30A is an example of a "second menu" according to the present exemplary embodiment. Further, the common setting value among the individual setting values for any combination of the list items 8A is an example of a "partial common setting value" according to the present exemplary embodiment.

The combination of the list items 8A to be specified for the setting values common among the individual setting values may be determined by applying the identical classification rule as the classification rule used to integrate the list items 8A, but different classification rules may be used.

In a case where there is no need to distinguish between the menu 30A and the submenu 30B, both the menu 30A and the submenu 30B are referred to as the "menu 30" below.

In a case where the menu items displayed on the submenu 30B include menu items including common setting values, the CPU 11 may repeat to execute a process of integrating the menu items including the common setting values, displaying the common setting value on the integrated menu item, and displaying the remaining setting values on another submenu 30B displayed for the submenu 30B. As described above, the process of sequentially extracting the common setting values from the setting values of each list item 8A classified into the identical group by the classification rule is referred to as a recursive process. By executing the recursive process, the setting values of each list item 8A classified into the identical group are hierarchically displayed by the menu 30.

That is, the CPU 11 displays the setting values of each list item 8A integrated into the list item 8C in a display form of N levels (N is a natural number) in which the list item 8C obtained by integrating the list items 8A classified into the identical group is set as a first level, the menu 30A displayed by selecting the list item 8C is set as a second level, the submenu 30B displayed by selecting the menu 30A is set as a third level, and submenus (not illustrated) displayed by selecting the submenu 30B are set as a fourth level and the subsequent levels.

The individual setting values in the list item 8C are displayed to be arranged in the horizontal direction of the menu 30A. In a case where the number of individual setting values increases, the individual setting values exceeds the display range of list 5 and are hidden.

Figure 10:
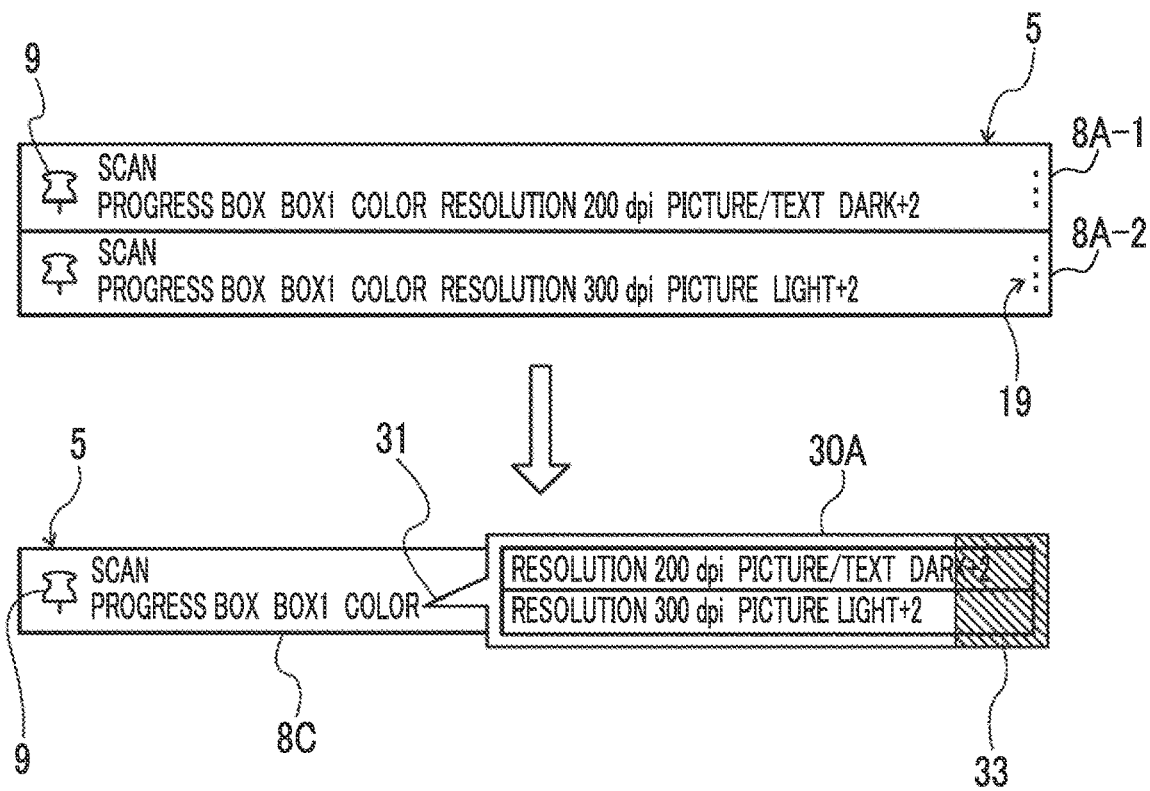
FIG. 10 is a diagram illustrating a display example in which a menu is displayed outside a display range of a list.

FIG. 10 is a diagram illustrating a display example in which the menu 30A is displayed beyond the display range of the list 5. The individual setting values of the list item 8A-1 and the list item 8A-2 in FIG. 10 are Resolution of 200 dpi, Photo/text, Dark+2 and Resolution of 300 dpi, Photo, Light+2, respectively. However, in a case where each individual setting value is displayed as it is in the menu item, one end of the menu 30A in the horizontal direction exceeds the display range of the list 5. Thus, the text in a region 33 on the menu 30A corresponding to a portion of the list 5 exceeding the display range of the list 5 is not displayed on the history screen 6, and thus the user has difficulty in ascertaining the contents of the menu 30A.

Therefore, in a case where the individual setting values exceed the display range of the list 5 and are hidden, the CPU 11 may display the original list item 8A itself in the list 5 without integrating each list item 8A classified into the identical group into the list item 8C.

As another form, in a case where the number of the common setting values of the list item 8A classified into the identical group is less than a predetermined value, the CPU 11 may display the original list item 8A itself in the list 5 without integrating each list item 8A classified into the identical group into the list item 8C. That is, in a case where there are a predetermined number or more of common setting values of the list item 8A classified into the identical group, the CPU 11 may perform control to integrate each list item 8A classified into the identical group into the list item 8C.

In a case where the list item 8A is integrated into the list item 8C and the setting values of the list items 8A integrated into the list item 8C are hierarchically displayed, the number of times of the user selecting the menu 30, which is required until a target setting value is displayed may increase as the hierarchy becomes deeper. That is, in a case where a plurality of list items 8A are integrated into the list item 8C, the user operation amount required to execute the function on the history screen 6 may increase as compared with a case where the list item 8A itself is displayed in the list 5.

In particular, in a case where the list item 8A with a higher selection frequency than the other list items 8A is integrated into the list item 8C together with the other list items 8A, and the setting values are hierarchically displayed, the user can be more likely to feel that the operability of the history screen 6 is lower than before the list item 8A is integrated.

Therefore, the CPU 11 set, as a representative list item 8A, the list item 8A that has been selected a predetermined number of times or more and selected the most times in the group among the list items 8A classified into the identical group. The representative list item 8A is an example of a representative operator according to the present exemplary embodiment.

In a case where the representative list item 8A is selected, the CPU 11 executes the designated function in accordance with each setting value displayed in the representative list item 8A. Therefore, the list item 8A set as the representative list item 8A does not show any change in operability before and after the list item 8A is set as the representative list item 8A.

On the other hand, the CPU 11 displays the other region 32, which has not been displayed in the list item 8A before being set as the representative list item 8A, on the representative list item 8A.

Figure 11:
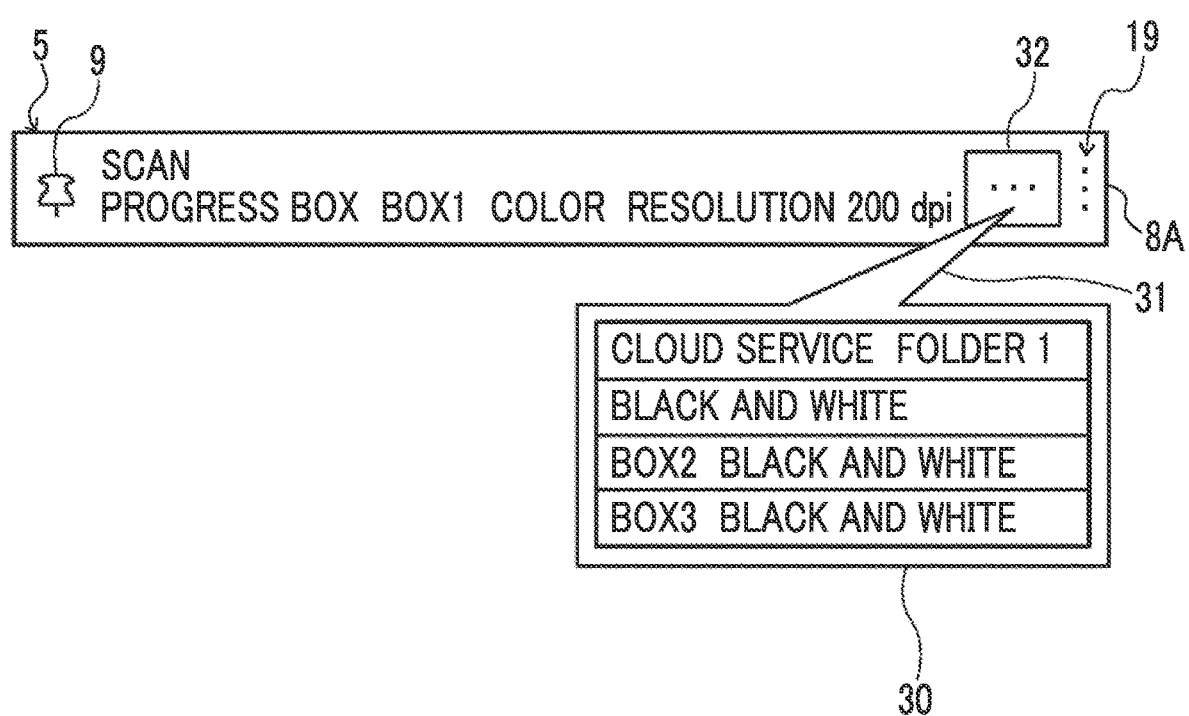
FIG. 11 is a diagram illustrating an example of a representative list item.

FIG. 11 is a diagram illustrating an example of the representative list item 8A. In a case where the user selects the other region 32 of the representative list item 8A, the CPU 11 displays, on the menu 30, the setting value different from the setting value of the representative list item 8A for each list item 8A other than the representative list item 8A, among the setting values of the list items 8A that are other than the representative list item 8A and are classified into the identical group as the representative list item 8A.

Specifically, the representative list item 8A illustrated in FIG. 11 is an example in a case where the list item 8A-1 is set as the representative list item 8A for the list items 8A-1 to 8A-5 illustrated in FIG. 8.

The setting values different from the setting values of the list item 8A-1 illustrated in FIG. 8 among the setting values displayed in the list item 8A-2 illustrated in FIG. 8 are Cloud service and Folder 1. Therefore, "Cloud Service and Folder 1" is displayed as the first menu item in the menu 30 of FIG. 11.

The setting value different from the setting values of the list item 8A-1 illustrated in FIG. 8 among the setting values displayed in the list item 8A-3 illustrated in FIG. 8 is Black-and-White. Therefore, "Black-and-White" is displayed as the second menu item in the menu 30 of FIG. 11.

The setting values different from the setting values of the list item 8A-1 illustrated in FIG. 8 among the setting values displayed in the list item 8A-4 illustrated in FIG. 8 are BOX2 and Black-and-White. Therefore, "BOX2 and Black-and-White" is displayed as the third menu item in the menu 30 of FIG. 11.

The setting values different from the setting values of the list item 8A-1 illustrated in FIG. 8 among the setting values displayed in the list item 8A-5 illustrated in FIG. 8 are BOX3 and Black-and-White. Therefore, "BOX3 and Black-and-White" is displayed as the fourth menu item in the menu 30 of FIG. 11.

The menu 30 displayed in a case where the other region 32 of the representative list item 8A is selected is an example of a "third menu" according to the present exemplary embodiment.

In a case where the menu item displaying any setting value is selected from the menu 30 displayed in a case where the other region 32 of the representative list item 8A is selected, the CPU 11 executes the designated function in a state where the setting value of the setting item to which the setting value selected from the menu 30 is set for the setting value of the representative list item 8A is replaced with the selected setting value.

For example, in the list item 8A illustrated in FIG. 11, in a case where "Black-and-White" being the second menu item of the menu 30 is selected, the CPU 11 executes the scanner function in accordance with the setting values after "Color" being the setting value of the identical output color among the setting values of the representative list item 8A, that is, Progress box, BOX1, Color, and Resolution of 200 dpi is replaced with "Black-and-White" because "Black-and-White" is the setting value of the output color, that is, Progress box, BOX1, Black-and-White, and Resolution of 200 dpi. This is the identical operation as an operation in a case where the list item 8A-3 in FIG. 8 is selected.

As described above, even in a case where the representative list item 8A is set from the list items 8A classified into the identical group, the user can execute the designated function under the identical execution conditions as the execution conditions in a case where another list item 8A classified into the identical group as the representative list item 8A is selected, by selecting the menu item of the menu 30 displayed in a case where the other region 32 is selected.

The CPU 11 records a selection frequency of the user for each list item 8A classified into the identical group to the representative list item 8A. Thus, in a case where the list item 8A having a selection frequency higher than the representative list item 8A appears in the identical group to the representative list item 8A, the CPU 11 may update the representative list item 8A, that is, set the list item 8A having a selection frequency higher than the current representative list item 8A, as the representative list item 8A. In addition, instead of updating the representative list item 8A, the CPU 11 may cancel the group of the list items 8A integrated into the representative list item 8A, and display each list item 8A in the canceled group, in the list 5. The CPU 11 updates the representative list item 8A or cancels the group of the list items 8A integrated into the representative list item 8A, in accordance with the condition setting of defining which process is to be performed in advance. The CPU 11 may display a dialog for causing the user to select which process to be executed on the history screen 6.

The CPU 11 may display, for example, a cancel button (not illustrated) for canceling the group on each list item 8C. In a case where the cancel button is selected, the CPU 11 may cancel the group of the list items 8A integrated into the list item 8C of which the cancel button has been selected, and display each list item 8A in the list 5 instead of the list item 8C. In this case, the CPU 11 may associate the group cancellation history with the list item 8A subject to group cancellation, and the list item 8A associated with the group cancellation history may be excluded from the group classification target in accordance with the classification rule in Step S10 illustrated in FIG. 5.

As described above, since the list item 8C is an example of the list item 8A, the CPU 11 may classify the list item 8C into the identical group to the newly set list item 8A in Step S10 illustrated in FIG. 5. That is, the CPU 11 may integrate the list item 8A with the existing list item 8C. Specifically, the CPU 11 generates a new list item 8C by integrating the list item 8A and the existing list item 8C, and displays the newly generated list item 8C in the list 5 instead of the integrated list items 8A and 8C.

Figure 12A:
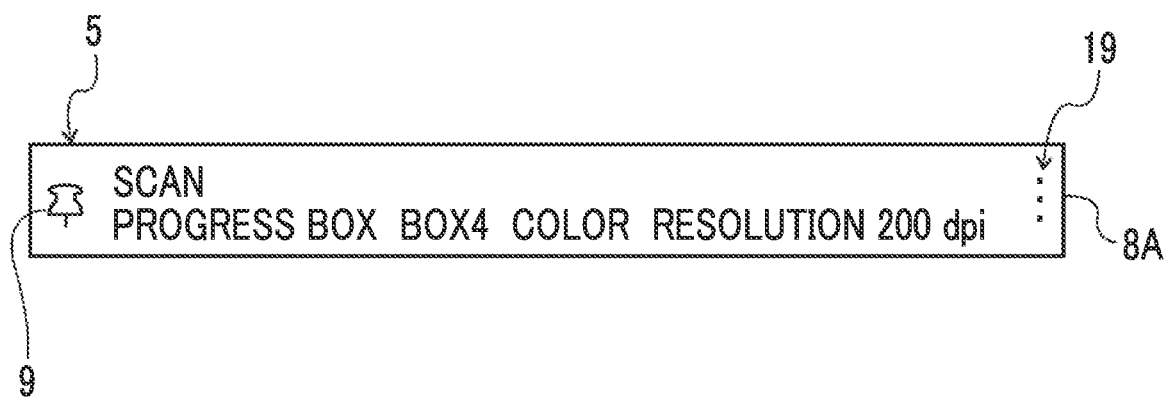
FIGS. 12A and 12B are diagrams illustrating an integration example of integrating a list item and an already integrated list item.
Figure 12B:
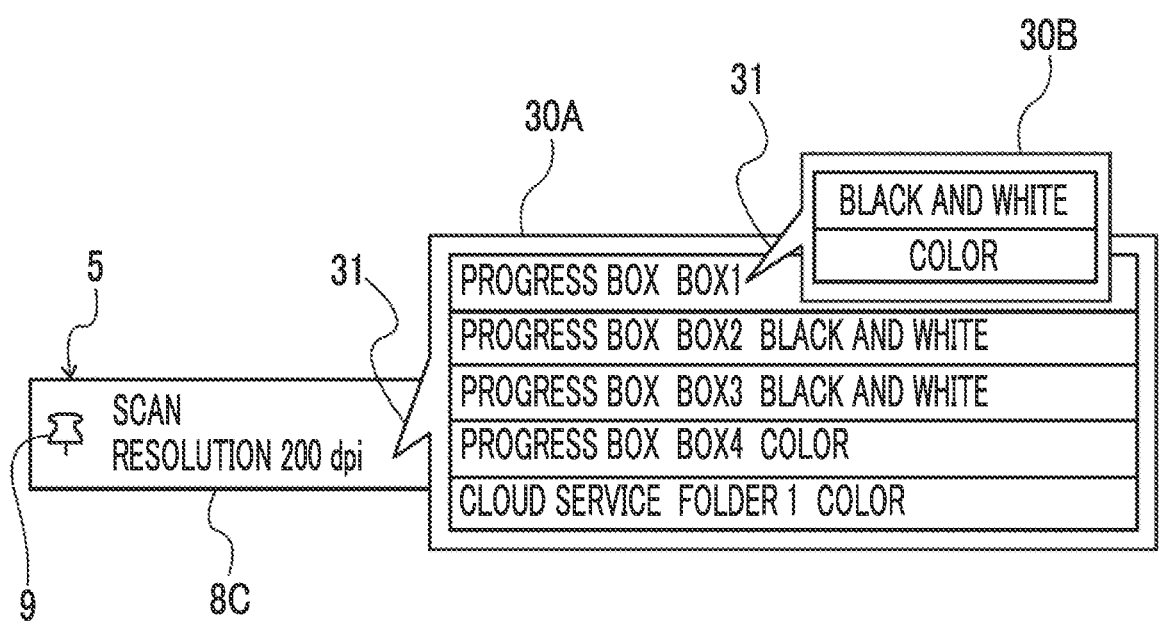

FIGS. 12A and 12B are diagrams illustrating an example of the list item 8C newly generated by integrating the list item 8A and the list item 8C illustrated in FIG. 9.

FIG. 12A illustrates an example of the list item 8A newly set by the user. FIG. 12B illustrates an example of the list item 8C newly generated by integrating the list item 8A illustrated in FIG. 12A with the list item 8C illustrated in FIG. 9.

The setting value of Resolution of 200 dpi among the setting values displayed in the list item 8A illustrated in FIG. 12A is common to the setting value displayed in the list item 8C illustrated in FIG. 9. Thus, the individual setting values of the list item 8A illustrated in FIG. 12A with respect to the list item 8C illustrated in FIG. 9 are Progress box, BOX4, and Color. Therefore, the menu items of "Progress box, BOX4, and Color", which do not exist in the menu 30A of FIG. 9, are added to the menu 30A of FIG. 12B. In a case where the user selects "Progress box, BOX4, and Color" menu items from the menu 30A illustrated in FIG. 12B, the scanner function is executed under the identical execution conditions to the execution conditions in a case where the list item 8A illustrated in FIG. 12A is selected.

Modification Example of Display of Pinned List Item Classified into Group

The display of the setting values of each list item 8A integrated into the list item 8C is not limited to the display example of hierarchically displaying the setting values as illustrated in FIG. 9.

For example, the CPU 11 may display the setting values of the list item 8A classified into the identical group by using a simplified setting screen 18 in which the number of setting items to which setting values are set on the setting screen 4 illustrated in FIG. 3 is reduced as compared with the original setting screen 4.

FIG. 13 is a diagram illustrating an example of the setting screen 18. The CPU 11 displays the list item 8C displaying the common setting values of the list items 8A classified into the identical group in Step S10 illustrated in FIG. 5, in the list 5 of the setting screen 18 in Step S30 illustrated in FIG. 5.

In a case where the list item 8C is selected from the list 5, the CPU 11 classifies the individual setting values of the list items 8A integrated into the list item 8C for each setting item, and displays a list item 8D associated with the setting item having the individual setting value, in the list 5 on the setting screen 18.

In a case where the user selects the list item 8D from the list 5 on the setting screen 18, the CPU 11 displays, in the list 5, all the individual setting values for the setting items associated with the selected list item 8D. The individual setting values displayed in the list 5 in this case are the setting values acquired from the setting values of any list item 8A integrated into the list item 8C. In a case where the user selects any one of the setting values displayed in the list 5 on the setting screen 18, the CPU 11 sets the selected setting value to the setting item for which the setting value has been selected. Further, the CPU 11 displays the selected setting value in the list item 8D corresponding to the setting item for which the setting value has been selected.

In a case where the user selects the setting value for each setting item and selects an execute button 18A on the setting screen 18, the CPU 11 executes the designated function in accordance with the common setting value displayed in the list item 8C and the setting value set on the setting screen 18.

Such a setting screen 18 is an example of a "setting screen for selecting setting values other than common setting values" according to the present exemplary embodiment.

After the selection of the list item 8C, any one individual setting value in each list item 8A integrated into the list item 8C is displayed, as the initial value of the setting item, in each list item 8D displayed in the list 5 on the setting screen 18. The CPU 11 may set any individual setting value as the initial value. Since the CPU 11 recognizes the setting value displayed in the list item 8D as the setting value selected by the user, for example, it is preferable that the individual setting value having the highest selection frequency among the individual setting values of the list items 8A integrated into the list item 8C is displayed in the list item 8D on the setting screen 18 as the initial value for each setting item corresponding to the list item 8D.

Regarding Integration Timing

In the display process of the list 5 illustrated in FIG. 5, the CPU 11 starts classification of the list item 8A in a case where the condition that the user newly sets the list item 8A is satisfied. Another condition may be set as the condition for starting the classification of the list item 8A.

For example, in a case where the CPU 11 determines that the number of list items 8A displayed in the list 5 on the history screen 6 has increased and the list 5 is in a state of being required to be scrolled to display each list item 8A on the screen, the CPU 11 may start classification of the list item 8A.

The CPU 11 may start classification of the list item 8A each time a predetermined period elapses, or start classification of the list item 8A each time the number of pinning operations on the list item 8B reaches a predetermined number. The CPU 11 may start classification of the list items 8A at a random timing, or may start classification of the list items 8A at a time set in advance by the user. The conditions for starting the classification of the list item 8A can be set by the user.

Before starting the classification of the list items 8A, the CPU 11 may start the classification or may display a selection screen (not illustrated) for causing the user to select whether or not the classification is performed, that is, whether the classification is started or stopped. In a case where the user selects classification stop, the CPU 11 stops the classification of the list item 8A even though the conditions for starting classification of the list item 8A are satisfied.

On the other hand, in a case where the list item 8C obtained by integrating the list items 8A classified into the identical group is displayed in the list 5 on the history screen 6 by the classification of the list items 8A, it is considered that, in executing the function, the user who normally selects the list item 8A before the integration is confused because the previously selected list item 8A has been deleted from the list 5.

Therefore, for example, it is preferable that the CPU 11 displays, on the history screen 6, integration information indicating that the list items 8A have been integrated, for each user who executes the function from the history screen 6.

However, in a case where the integration information is displayed on the history screen 6 each time the user executes the function from the history screen 6, the user may feel troublesome for the display of the integration information. Therefore, in a case where the user first executes the function from the history screen 6 after the integration of the list item 8A, for example, it is preferable that the CPU 11 executes a process of displaying the integration information on the history screen 6, for each user.

The CPU 11 displays the integration information by displaying at least one of a document or an image in a dialog, for example. The CPU 11 may display, on the history screen 6, an animation dynamically indicating the integrated list item 8A and the list item 8C.

Further, in a case where there is a user who has not ascertained the integration information even after a predetermined period of time has passed, the CPU 11 may notify the user who has not ascertained the integration information to ascertain the integration information. Specifically, the user who has not ascertained the integration information executes an authentication process to use the image forming apparatus 2. After the authentication is completed, a message for urging the user to ascertain the integration information may be displayed on the display unit 22.

Regarding Classification Rule

Next, a specific example of the classification rule applied in a case where the list items 8A are classified into the groups in Step S10 illustrated in FIG. 5 will be described.

The classification rule may be represented as an evaluation function of outputting a score based on predetermined evaluation criteria for a combination of the list items 8A.

The evaluation function outputs a higher score for a combination of list items 8A with a higher evaluation based on the evaluation criteria, that is, for list items 8A that are considered to be desired to be integrated from the viewpoint of the evaluation criteria.

There are no restrictions on the contents of the evaluation criteria. For example, in a case where an evaluation criterion in which the smaller the difference between the setting values for each setting item in each list item 8A, the higher the evaluation is used, the classification rule in Step S10 illustrated in FIG. 5 is obtained.

In addition, in a case where the setting values for each setting item in each list item 8A are hierarchically displayed by using the menu 30, the evaluation criterion in which the lower the operation amount performed by the user in selecting the setting values, the higher the evaluation may be used.

In addition, in a case where the setting values for each setting item in each list item 8A are hierarchically displayed by using the menu 30, the evaluation criterion in which the lower the display hierarchy of the setting value, the higher the evaluation may be used.

Furthermore, in a case where the setting values for each setting item in each list item 8A are displayed on the simplified setting screen 18 illustrated in FIG. 13, the evaluation criterion in which the lower the user operation amount in selecting the setting values, the higher the evaluation may be used.

Figure 14:
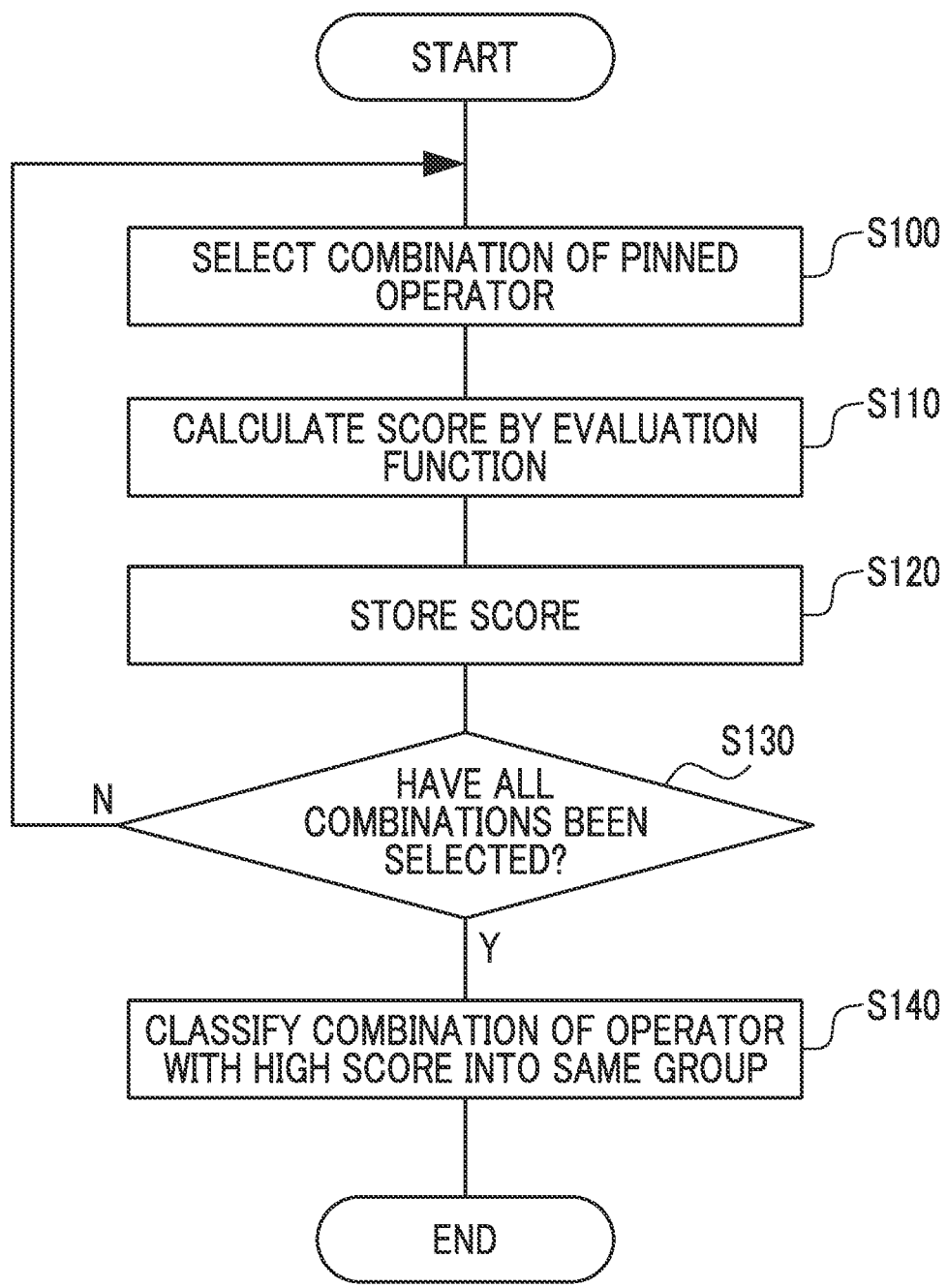
FIG. 14 is a flowchart illustrating an example of a flow of a classification process.

FIG. 14 is a flowchart illustrating an example of the flow of a classification process for classifying the list items 8A into groups in Step S10 of the display process of the list 5 illustrated in FIG. 5.

The CPU 11 reads the information processing program stored in the ROM 12 and executes the classification process forming the display process of the list 5 illustrated in FIG. 5.

In Step S100 of FIG. 14, the CPU 11 selects any one combination from all combinations of the list items 8A.

In Step S110, the CPU 11 acquires, for example, an evaluation function stored in advance in the non-volatile memory 14, inputs the combination of the list items 8A selected in Step S100 into the acquired evaluation function, and calculates the score of the evaluation function. The input of the combination of the list items 8A into the evaluation function means an input of the setting value of the list item 8A into the evaluation function for each of the combined list items 8A.

In Step S120, the CPU 11 stores the score of the evaluation function calculated in Step S110 in the RAM 13 for each combination of list items 8A.

In Step S130, the CPU 11 determines whether or not all combinations of list items 8A that may be selected from all the list items 8A in Step S100 have been selected. In a case where there is an unselected combination of list items 8A, the process proceeds to Step S100 and a new combination of list items 8A is selected. That is, by repeatedly executing Steps S100 to S130 until all the combinations of the list items 8A are selected, the score of the evaluation function is calculated for each combination of the list items 8A.

In a case where it is determined in the determination process of Step S130 that all the combinations of list items 8A have been selected, the process proceeds to Step S140.

In Step S140, the combination of list items 8A with the highest evaluation function score among all the combinations of list items 8A is classified into the identical group, and the classification process illustrated in FIG. 14 is ended. As a result, in Step S10 of FIG. 5, the list items 8A are classified into groups consisting of a plurality of list items 8A.

In the classification process illustrated in FIG. 14, an example of classifying the list items 8A by using one evaluation function has been described. The list items 8A may be classified by using a plurality of evaluation functions having different evaluation criteria.

Specifically, in Step S110 of the classification process illustrated in FIG. 14, the CPU 11 acquires a plurality of evaluation functions from the non-volatile memory 14 and calculates the score for each evaluation function.

Then, in Step S140 of the classification process illustrated in FIG. 14, the CPU 11 displays, on the history screen 6, the combination having the highest score among all the combinations of the list items 8A for each evaluation function, and causes the user to select the combination to be classified into the identical group from the combinations of the list items 8A. The evaluation function used to calculate the score can be selected by the user.

For example, the CPU 11 displays the score for different combinations of list items 8A in a selectable form on the history screen 6, and classifies the combinations of list items 8A corresponding to the scores selected by the user into the identical group. An operation target used to select different combinations of list items is an example of a "selection operator" according to the present exemplary embodiment.

FIG. 15 is a diagram illustrating a display example of the score in a case where there is one evaluation function. In this case, the CPU 11 displays a selection screen 34 on the history screen 6 in order from the combination of the list items 8A with the highest score among all the combinations of the list items 8A. On the selection screen 34, the score and the common setting value in the combination of the list items 8A are associated with each other. In other words, the CPU 11 displays candidates for the list item 8C after the integration in a case of assuming that the combined list items 8A are integrated. The CPU 11 may display the combined list items 8A instead of or in addition to the list items 8C after the integration.

The CPU 11 does not necessarily display the scores on the selection screen 34 in a case where the CPU 11 displays the selection screen 34 to ascertain the magnitude relation of the scores for each combination of the list items 8A.

For example, the CPU 11 may display the common setting values for each combination of the list items 8A in descending order of the score. Further, the CPU 11 may perform display such that the common setting value in each combination of list items 8A associated with a higher score has a larger display area.

Further, the CPU 11 may change the display form of the common setting values in the combination of the list items 8A associated with the highest score to the display form of the common setting values in the other combinations of the list items 8A. Specifically, the CPU 11 may change at least one of the font size, the color, or the type of common setting value in the combination of the list items 8A associated with the highest score, or enclose at least one of the font size, the color, or the type of common setting value with a frame. Further, the CPU 11 may emphasize the common setting value in the combination of the list item 8A associated with the highest score by associating the common setting value in the combination of the list item 8A with a text string or a symbol such as "recommended" and "!", for example.

In such a case, the user classifies the combination of list items 8A corresponding to the selected common setting values, into the identical group. That is, the region displaying each common setting value is an example of the selection operator.

On the other hand, FIG. 16 is a diagram illustrating a display example of the score in a case where there are a plurality of evaluation functions. In this case, the CPU 11 displays, on the history screen 6, a selection screen 36 in which the highest score among the combinations of all the list items 8A for each evaluation function is associated with the evaluation criterion of the evaluation function.

The first line of the selection screen 36 illustrated in FIG. 16 indicates the highest value of the score calculated based on the evaluation criterion in which the lower the user operation amount in selecting the setting value, the higher the evaluation, in a case where the setting values are hierarchically displayed for the combination of the list item 8A by using the menu 30 illustrated in FIG. 9. In addition, the second line of the selection screen 36 illustrated in FIG. 16 indicates the highest value of the score calculated based on the evaluation criterion in which the lower the user operation amount in selecting the setting value, the higher the evaluation, in a case where the setting values are set to be displayed for the combination of the list items 8A on the simplified setting screen 18 as illustrated in FIG. 13.

In the example of the selection screen 36 illustrated in FIG. 16, the CPU 11 determines that displaying the setting values on the simplified setting screen 18 is desired as compared to hierarchically displaying the setting values by using the menu 30. However, in a case where the user thinks that the setting values are desired to be hierarchically displayed by using the menu 30, and the score "82" displayed next to "hierarchical display" is selected, the CPU 11 hierarchically displays the setting values by using the menu 30 as illustrated in FIG. 9.

Although an example of calculating the score by using the evaluation function has been described above, the CPU 11 may calculate the score by using a learning model obtained by machine learning the relationship between the combination of the list items 8A and the score.

Specifically, a plurality of pieces of pair data in which combinations of list items 8A input to the evaluation function and outputs of the evaluation function for the combinations of list items 8A are associated with each other are collected as teacher data. Then, the CPU 11 inputs the combination of the list items 8A included in any piece of teacher data to the learning model, and repeats to adjust parameters of the learning model so that the output of the learning model in this case approaches the score included in the identical teacher data to the combination of the list items 8A input to the learning model. In this manner, the CPU 11 performs machine learning of the learning model.

For the learning model, for example, a known neural network including an input layer, an intermediate layer, and an output layer can be used. The parameters of the learning model are adjusted by adjusting the weighting parameter representing the degree of coupling nodes forming the neural network, for example, by using a method such as a gradient descent method and an error backpropagation method, such that the difference between the score output by the learning model and the score of the teacher data is minimized. In a case where there are a plurality of evaluation functions, a learning model may be prepared for each evaluation function.

The CPU 11 may display, on the history screen 6, for example, a re-classify button (not illustrated) for receiving an instruction from the user to re-classify the list items 8A already integrated into the list items 8C, in association with each of the list items 8C.

In a case where the user selects the re-classify button corresponding to any of the list items 8C, the CPU 11 cancels the group of the list items 8A integrated into the list item 8C for which the re-classify button has been selected. Then, the CPU 11 performs re-classification of the list items 8A to generate a new list item 8C. Specifically, the CPU 11 re-calculates the scores by inputting each combination of the list items 8A that are not integrated into the list item 8C into the evaluation function, and re-classifies the list items 8A.

Regarding the re-classification of the list items 8A, the selection screen 34 as illustrated in FIG. 15 and the selection screen 36 as illustrated in FIG. 16 may be displayed on the history screen 6, and the user may be caused to select the list items 8A to be classified into the identical group.

In the present exemplary embodiment, an example in which the function name and the setting value of each setting item are displayed in the list item 8 of the list 5, and pinning is performed on the list item 8 has been described. The pinned operator is not limited to the list item 8 as long as the operator is executed in accordance with the associated setting information in a case where the list item 8 has been selected. The pinned operator may be, for example, a button. In a case where the pinned operator is the button, the button associated with the setting information may be displayed on the history screen 6. In a case where the button is hidden on the history screen 6, the page may be switched and the button may be displayed on the next page. Page switching on the history screen 6 corresponds to scrolling the list 5.

As described above, one form of the information processing apparatus has been described by using the exemplary embodiment, but the disclosed form of the information processing apparatus is an example, and the form of the information processing apparatus is not limited to the scope described in the exemplary embodiment. Various changes or improvements may be made to each exemplary embodiment without departing from the gist of the present disclosure, and the changed or improved modes are also included in the technical scope of the present disclosure. For example, the order in the display process of the list 5 illustrated in FIG. 5 and the classification process illustrated in FIG. 14 may be changed without departing from the gist of the present disclosure.

Further, in the above-described exemplary embodiment, as an example, a form in which the display process of the list 5 and the classification process are realized by software has been described. However, the processes equivalent to the flowcharts illustrated in FIGS. 5 and 14 may be processed by hardware. In this case, the speed of the process can be increased as compared to the case where each process is realized by software.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Although the example in which the information processing program is stored in the ROM 12 has been described in each exemplary embodiment, the storage destination of the information processing program is not limited to the ROM 12. The information processing program according to the present disclosure can also be provided in a form of being recorded on a storage medium readable by the computer 10. For example, the information processing program may be provided in a form of being recorded on an optical disc such as a compact disk read only memory (CD-ROM) and a digital versatile disk read only memory (DVD-ROM). The information processing program may be provided in a form in which the information processing program is recorded in a portable semiconductor memory such as a universal serial bus (USB) memory and a memory card. The ROM 12, the non-volatile memory 14, the CD-ROM, the DVD-ROM, the USB, and the memory card are examples of the non-transitory storage medium.

Furthermore, the image forming apparatus 2, which is an example of the information processing apparatus, may download the information processing program from an external device connected to a communication line through the communication unit 20, and store the downloaded information processing program in a storage device. In this case, the CPU 11 of the image forming apparatus 2 reads the information processing program downloaded from the external device and executes the display process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
classify a plurality of first operators into groups in accordance with a predetermined rule, the first operators being operators associated with setting values of items for defining execution conditions of functions, and being subjected to remaining setting for causing a first operator to preferentially remain in a list over other operators among operators in the list, which execute a function in accordance with the execution condition in a case of being selected by a user;
generate a second operator that is a new operator obtained by integrating the first operators classified into an identical group;
display the second operator in the list instead of each of the first operators classified into the identical group;
display a common setting value on the second operator for the items, the common setting value being common to each of the first operators classified into the identical group, and in a case where the second operator is selected, display a first menu displaying setting values other than the common setting value, together with the list in association with the second operator;
and recursively execute a process of, in a case where the setting values other than the common setting value further include a partial common setting value common for at least one of the items, displaying the partial common setting value on the first menu, and in a case where the first menu is selected, displaying a second menu displaying setting value other than the partial common setting value together with the list in association with menu items of the first menu.

2. The information processing apparatus according to claim 1, wherein the processor is configured to:
in a case where the setting values other than the common setting value are displayed to be arranged in one direction in the first menu, and the setting values displayed on the first menu are hidden in a display range of the list, display the original first operators in the list without integrating the first operators classified into the identical group to the second operator.

3. The information processing apparatus according to claim 1, wherein the processor is configured to:

in a case where the first operators classified into the identical group include a representative operator that is an operator selected a predetermined number of times or more and selected most times in the group, set the representative operator as the second operator, and in a case where a predetermined region provided on the representative operator is selected, display a third menu in the list in association with the representative operator, the third menu displaying a setting value different from the setting value displayed on the representative operator among the setting values displayed on the first operators that are other than the representative operator and are classified into the identical group to the representative operator.

4. The information processing apparatus according to claim 3, wherein the processor is configured to:

in a case where any setting value is selected from the third menu, execute the function in accordance with each setting value after the setting value of the item on which the setting value selected on the third menu is set is replaced with the setting value selected on the third menu with respect to the setting value displayed on the representative operator, and in a case where a region other than the predetermined region on the representative operator is selected, execute the function in accordance with each setting value displayed on the representative operator.

5. The information processing apparatus according to claim 1, wherein the processor is configured to:

display a common setting value displayed to be common to each of the first operators classified into the identical group, on the second operator for the item, and in a case where the second operator is selected, display a setting screen for selecting a setting value other than the common setting value for each of the items on which setting values other than the common setting value are set.

6. The information processing apparatus according to claim 5, wherein the processor is configured to:

display a setting value selected most frequently among the setting values respectively associated with the first operators classified into the identical group, on the setting screen for each of the items on which the setting values other than the common setting value are set.

7. The information processing apparatus according to claim 1, wherein the processor is configured to:

classify a newly set first operator into the identical group as an existing second operator, in accordance with the predetermined rule, generate a new operator by integrating the newly set first operator and the second operator, and display the newly generated operator in the list instead of the newly set first operator and the second operator.

8. The information processing apparatus according to claim 1, wherein the processor is configured to:

in a case where the first operators satisfy predetermined conditions for the first operators, start classification of the first operators.

9. The information processing apparatus according to claim 8, wherein the processor is configured to:

display a selection screen for causing a user to select whether to classify the first operators before starting the classification of the first operators.

10. The information processing apparatus according to claim 1, wherein the processor is configured to:

in a case of generating the second operator, display integration information on a screen for each user who executes the function, the integration information representing integration of the first operators.

11. The information processing apparatus according to claim 10, wherein the processor is configured to:

display the integration information on the screen in a case where the user firstly executes the function after the second operator is generated.

12. The information processing apparatus according to claim 1, wherein the predetermined rule is represented as an evaluation function that outputs a higher score for the first operators desired to be integrated as the second operator, and the processor is configured to classify the first operators into the identical group by using the score.

13. The information processing apparatus according to claim 12, wherein the processor is configured to:

classify a combination of the first operators having a highest score into the identical group.

14. The information processing apparatus according to claim 12, wherein the processor is configured to:

calculate the score for each of a plurality of evaluation functions having different evaluation criteria, display a combination of the first operators having a highest score on a screen for each of the evaluation functions, and cause a user to select any combination of the first operators displayed on the screen.

15. The information processing apparatus according to claim 12, wherein the processor is configured to:

display a selection operator for selecting a different combination of the first operators on a screen, and perform group re-classification to classify the first operators corresponding to the selection operator selected by a user into the identical group.

16. The information processing apparatus according to claim 15, wherein the processor is configured to:

display the selection operator to ascertain a magnitude relation of the score for each combination of the first operators.

17. The information processing apparatus according to claim 16, wherein the processor is configured to:

in a case where there is one evaluation function, calculate the score for each combination of the first operators, and display the selection operator on a screen in descending order of the calculated scores, and in a case where there are a plurality of evaluation functions having different evaluation criteria, calculate the score for each combination of the first operators for each evaluation function, and display the selection operator corresponding to a highest score for each evaluation function.

18. A non-transitory computer readable storage medium storing an information processing program causing a computer to execute a process comprising:

classifying a plurality of first operators into groups in accordance with a predetermined rule, the first operators being operators associated with setting values of items for defining execution conditions of functions, and being subjected to remaining setting for causing a first operator to preferentially remain in a list over other operators among operators in the list, which execute a function in accordance with the execution condition in a case of being selected by a user;

generating a second operator that is a new operator obtained by integrating the first operators classified into the identical group;

displaying the second operator in the list instead of the first operators classified into the identical group;

display a common setting value on the second operator for the items, the common setting value being common to each of the first operators classified into the identical group, and in a case where the second operator is selected, display a first menu displaying setting values other than the common setting value, together with the list in association with the second operator;

and recursively executing a process of, in a case where the setting values other than the common setting value further include a partial common setting value common for at least one of the items, displaying the partial common setting value on the first menu, and in a case where the first menu is selected, displaying a second menu displaying setting value other than the partial common setting value together with the list in association with menu items of the first menu.

* * * * *